US011165462B2

(12) United States Patent
Kulkarni et al.

(10) Patent No.: US 11,165,462 B2
(45) Date of Patent: Nov. 2, 2021

(54) MOTION ASSISTED LEAKAGE REMOVAL FOR RADAR APPLICATIONS

(71) Applicant: Samsung Electronics Co., Ltd., Suwon-si (KR)

(72) Inventors: Mandar N. Kulkarni, Richardson, TX (US); Boon Loong Ng, Plano, TX (US); Vutha Va, Plano, TX (US); Pengda Huang, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 16/575,226

(22) Filed: Sep. 18, 2019

(65) Prior Publication Data

US 2020/0145042 A1    May 7, 2020

Related U.S. Application Data

(60) Provisional application No. 62/756,682, filed on Nov. 7, 2018, provisional application No. 62/788,185, filed on Jan. 4, 2019.

(51) Int. Cl.
*H04B 1/525* (2015.01)
*G01S 13/10* (2006.01)
*H04L 25/02* (2006.01)

(52) U.S. Cl.
CPC ............ *H04B 1/525* (2013.01); *G01S 13/103* (2013.01); *H04L 25/0212* (2013.01)

(58) Field of Classification Search
None
See application file for complete search history.

(56) References Cited

U.S. PATENT DOCUMENTS 5,264,855 A    11/1993  Lammers et al.
5,657,021 A *   8/1997  Ehsani-Nategh ..... G01S 13/931
                                                  342/70

(Continued)

FOREIGN PATENT DOCUMENTS

CN    104052555 A  *  9/2014
CN    109948661 A  *  6/2019

(Continued)

OTHER PUBLICATIONS

A. Ledergerber, M. Hamer and R. D'Andrea, "Angle of Arrival Estimation based on Channel Impulse Response Measurements," 2019 IEEE/RSJ International Conference on Intelligent Robots and Systems (IROS), 2019, pp. 6686-6692, doi: 10.1109/IROS40897. 2019.8967562. (Year: 2019).*

(Continued)

*Primary Examiner* — Berhanu Tadese

(57) ABSTRACT

A method and electronic device for motion assisted leakage removal. The electronic device includes a radar transceiver, a sensor, and a processor. The processor is configured to determine that the electronic device is in a first motion state, During the first motion state, the processor is configured to transmit a first set of signals. The processor is also configured to generate a first channel impulse response (CIR) based on the received first set of signals. The processor is further configured to apply a filter that estimates a leakage depicted by the first CIR. During a second motion state, the processor is configured to transmit a second set of signals. Additionally, the processor is configured to generate a second CIR based on the received second set of signals, and apply the estimated leakage from the first CIR to the second CIR to remove leakage from the second CIR.

20 Claims, 12 Drawing Sheets

(56) References Cited

U.S. PATENT DOCUMENTS

| | | | | |
|---|---|---|---|---|
| 6,453,247 | B1* | 9/2002 | Hunaidi | G01M 3/243 |
| | | | | 702/51 |
| 7,656,347 | B2* | 2/2010 | Hong | G01S 7/032 |
| | | | | 342/194 |
| 9,071,337 | B2* | 6/2015 | Hellsten | G01S 13/32 |
| 9,140,784 | B1* | 9/2015 | Friesel | F41H 11/00 |
| 9,285,461 | B2* | 3/2016 | Swirhun | G01S 7/03 |
| 9,297,885 | B2* | 3/2016 | Ferguson | G01S 7/038 |
| 9,297,886 | B1* | 3/2016 | Mountcastle | G01S 7/36 |
| 9,557,409 | B2* | 1/2017 | Ferguson | G01S 7/023 |
| 9,638,796 | B2* | 5/2017 | Binzer | H01Q 21/08 |
| 10,014,948 | B2* | 7/2018 | Ashrafi | H04B 10/40 |
| 10,018,716 | B2* | 7/2018 | Ferguson | G01S 7/4008 |
| 10,291,460 | B2* | 5/2019 | Zhang | H04W 72/0413 |
| 10,310,069 | B2 | 6/2019 | Younis | |
| 10,374,710 | B2* | 8/2019 | Ashrafi | H04L 27/3405 |
| 10,380,881 | B2* | 8/2019 | Xu | G01S 13/003 |
| 2002/0175849 | A1* | 11/2002 | Arndt | G01S 13/0209 |
| | | | | 342/22 |
| 2006/0239385 | A1* | 10/2006 | Hofmeister | H04L 25/0212 |
| | | | | 375/340 |
| 2007/0045427 | A1* | 3/2007 | Onishi | H04N 1/32208 |
| | | | | 235/494 |
| 2008/0242245 | A1 | 10/2008 | Aparin | |
| 2009/0213920 | A1* | 8/2009 | Yip | H04L 25/0222 |
| | | | | 375/231 |
| 2009/0303103 | A1 | 12/2009 | Winstead et al. | |
| 2010/0109938 | A1 | 5/2010 | Oswald et al. | |
| 2010/0309959 | A1* | 12/2010 | Lakkis | H04L 27/2007 |
| | | | | 375/150 |
| 2011/0243202 | A1* | 10/2011 | Lakkis | H04B 1/525 |
| | | | | 375/219 |
| 2011/0309969 | A1* | 12/2011 | Gravelle | G01S 13/765 |
| | | | | 342/130 |
| 2012/0099403 | A1 | 4/2012 | Dahl et al. | |
| 2012/0127021 | A1* | 5/2012 | Gravelle | G01S 13/765 |
| | | | | 342/130 |
| 2014/0093021 | A1* | 4/2014 | Jain | H04L 25/023 |
| | | | | 375/346 |
| 2014/0195577 | A1 | 7/2014 | Nikitin | |
| 2014/0288867 | A1* | 9/2014 | Karlsson | G01P 15/00 |
| | | | | 702/96 |
| 2014/0341326 | A1* | 11/2014 | Choi | H04L 25/0214 |
| | | | | 375/350 |
| 2015/0301167 | A1 | 10/2015 | Sentelle et al. | |
| 2015/0332785 | A1* | 11/2015 | Steensgaard-Madsen | |
| | | | | H03M 5/02 |
| | | | | 341/122 |
| 2016/0127073 | A1* | 5/2016 | Ashrafi | H04B 10/516 |
| | | | | 398/44 |
| 2016/0320471 | A1* | 11/2016 | Preussner | G01S 13/584 |
| 2017/0026095 | A1* | 1/2017 | Ashrafi | H04L 9/0852 |
| 2017/0146638 | A1* | 5/2017 | Aoyama | G01S 13/532 |
| 2017/0343750 | A1* | 11/2017 | Ashrafi | H04B 10/60 |
| 2017/0366270 | A1* | 12/2017 | Ashrafi | H04B 10/70 |
| 2018/0069631 | A1* | 3/2018 | Ashrafi | G02B 6/4246 |
| 2018/0115439 | A1* | 4/2018 | Bhatti | G01S 13/765 |
| 2018/0284262 | A1* | 10/2018 | Villano | G01S 7/2813 |
| 2018/0309474 | A1 | 10/2018 | Cheung et al. | |
| 2018/0323657 | A1* | 11/2018 | Hannigan | H02J 50/23 |
| 2018/0365975 | A1* | 12/2018 | Xu | G01V 3/12 |
| 2019/0227156 | A1* | 7/2019 | Santra | G01S 7/415 |
| 2019/0327124 | A1* | 10/2019 | Lai | H04L 27/362 |
| 2020/0025869 | A1* | 1/2020 | Chuang | G01S 7/032 |
| 2020/0025876 | A1* | 1/2020 | Chuang | A61B 5/113 |
| 2020/0044915 | A1* | 2/2020 | Wang | H04W 72/042 |
| 2020/0073480 | A1* | 3/2020 | Hof | G06F 3/017 |
| 2020/0145042 | A1* | 5/2020 | Kulkarni | H04L 25/0212 |
| 2020/0326422 | A1* | 10/2020 | Sagi | G01S 7/414 |
| 2020/0400779 | A1* | 12/2020 | Qiu | G01S 13/103 |
| 2021/0003690 | A1* | 1/2021 | Choi | G06K 9/00288 |
| 2021/0034160 | A1* | 2/2021 | Hof | H04B 7/043 |

FOREIGN PATENT DOCUMENTS

| | | | | | |
|---|---|---|---|---|---|
| CN | 110929692 | A | * | 3/2020 | |
| CN | 111079545 | A | * | 4/2020 | |
| CN | 111126161 | A | * | 5/2020 | |
| EP | 3186654 | B1 | * | 11/2018 | H04W 4/023 |
| KR | 20080107551 | A | * | 12/2008 | |
| KR | 20090013957 | A | * | 2/2009 | |
| KR | 10-2017-0056570 | A | | 5/2017 | |
| KR | 102090530 | B1 | * | 3/2020 | |
| WO | WO-2020096365 | A1 | * | 5/2020 | H04B 1/525 |

OTHER PUBLICATIONS

H. Godrich, A. M. Haimovich and R. S. Blum, "Target Localization Accuracy Gain in MIMO Radar-Based Systems," in IEEE Transactions on Information Theory, vol. 56, No. 6, pp. 2783-2803, Jun. 2010, doi: 10.1109/TIT.2010.2046246. (Year: 2010).*
International Search Report dated Feb. 19, 2020 in connection with International Patent Application No. PCT/KR2019/015047, 4 pages.
Written Opinion of the International Searching Authority dated Feb. 19, 2020 in connection with International Patent Application No. PCT/KR2019/015047, 3 pages.
Extended European Search Report dated Jul. 16, 2021 regarding Application No. 19882756.0, 11 pages.

* cited by examiner

MOTION ASSISTED LEAKAGE REMOVAL FOR RADAR APPLICATIONS

CROSS-REFERENCE TO RELATED APPLICATION AND CLAIM OF PRIORITY

This application claims priority under 35 U.S.C. § 119(e) to U.S. Provisional Patent Application No. 62/756,682 filed Nov. 7, 2018 and U.S. Provisional Patent Application No. 62/788,185 filed Jan. 4, 2019, each of which are incorporated herein by reference in their entireties.

TECHNICAL FIELD

The present disclosure relates generally to removing leakage in radar applications. More specifically, the present disclosure relates to leakage removal for radar applications using different motion states.

BACKGROUND

Radar operates to localize targets in the radar field of view in terms of range and/or angle (azimuth and/or elevation) and/or velocity. Radars have been used predominantly for military, vehicular and medicine applications. Recently, there has been growing interest in using radars for several non-conventional applications. In particular, radars operating at mmWave frequencies, for instance at 60 GHz, are being considered. Example applications include use in smart phones for face detection or use in automated robots (like automated robot cleaners) for help in navigation. Radar applications in such devices present new challenges owing to the different target environments and different specifications on hardware constraints and performance metrics used for evaluating radar performance. For instance, automated robots that use 60 GHz radar for assistance in navigation need to accurately detect targets while the robot is moving as well as when the robot is static. Furthermore, such radar should be able to distinguish false targets which occur due to floor variations or under the floor objects from the actual targets that interfere with the robot's navigation path.

Some embodiments of radar include the transmitter antenna array and the receiver antenna array near in proximity to each other (such as within few centimeters), which can be due to limitations of the size of the device or based on the specifications of the device operation (such as field of view of interest). When the transmitter and receiver are close to each other, some of the signal from the transmitter can leak directly to the receiver in addition to a reflected signal that bounces off targets in the environment. These signals can comprise single or multiple instances of the transmitted signal bouncing off desired targets and single or multiple instances of the transmitted signal bouncing off non-target objects in the environment. The contribution from all unwanted sources to the received signal will be referred to as leakage throughout the present disclosure. It is desirable to remove the leakage from the signal created to improve accuracy of the resulting signal.

Current methods of separating the contribution of the leakage from the contribution of the target assume that either the target contribution or the leakage contribution can be suppressed by some means. For example, current methods utilize knowledge of the target location, control the changing of the location of the target, control the suppressing target contribution to received signal, or utilize prior knowledge of leakage contribution. These methods cannot be used in situations where potential targets are completely unknown in shape, size, or location, or when the environment is constantly changing.

SUMMARY

Embodiments of the present disclosure include a method and electronic device for motion assisted leakage removal. In one embodiment, an electronic device includes a radar transceiver configured to transmit and receive signals, a sensor configured to detect motion of the electronic device, and a processor. The processor is configured to determine, based on information obtained from the sensor, a first motion state of the electronic device, control the radar transceiver to transmit a first set of signals during the first motion state of the electronic device, generate a first channel impulse response (CIR) based on the first set of signals being received, apply a filter that estimates a leakage included in the first CIR, during a second motion state of the electronic device, control the radar transceiver to transmit a second set of signals, generate a second CIR based on the second set of signals, and apply the estimated leakage from the first CIR to the second CIR to remove leakage from the second CIR.

In another embodiment, a method of removing leakage for radar applications includes determining, based on information obtained from a sensor, that an electronic device is in a first motion state, transmitting a first set of signals, generating a first channel impulse response (CIR) based on the first set of signals being received, applying a filter that estimates a leakage depicted by the first CIR, in a second motion state, transmitting a second set of signals, generating a second CIR based on the second set of signals, and applying the estimated leakage from the first CIR to the second CIR to remove leakage from the second CIR.

In another embodiment, a non-transitory computer readable medium stores instructions that, when executed by a processor, cause the processor to determine, based on information obtained from a sensor on an electronic device, that the electronic device is in a first motion state, control a radar transceiver to transmit a set of signals, generate a first channel impulse response (CIR) based on the first set of signals being received, apply a filter that estimates a leakage depicted by the first CIR, in a second motion state, control the radar transceiver to transmit a second set of signals, generate a second CIR based on the second set of signals, and apply the estimated leakage from the first CIR to the second CIR to remove leakage from the second CIR.

Other technical features may be readily apparent to one skilled in the art from the following figures, descriptions, and claims.

Before undertaking the DETAILED DESCRIPTION below, it may be advantageous to set forth definitions of certain words and phrases used throughout the present disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout the present disclosure. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which like reference numerals represent like parts.

DETAILED DESCRIPTION

FIGS. 1 through 17, discussed below, and the various embodiments used to describe the principles of the present disclosure are by way of illustration only and should not be construed in any way to limit the scope of the disclosure. Those skilled in the art will understand that the principles of the present disclosure may be implemented in any suitable device.

Figure 1:
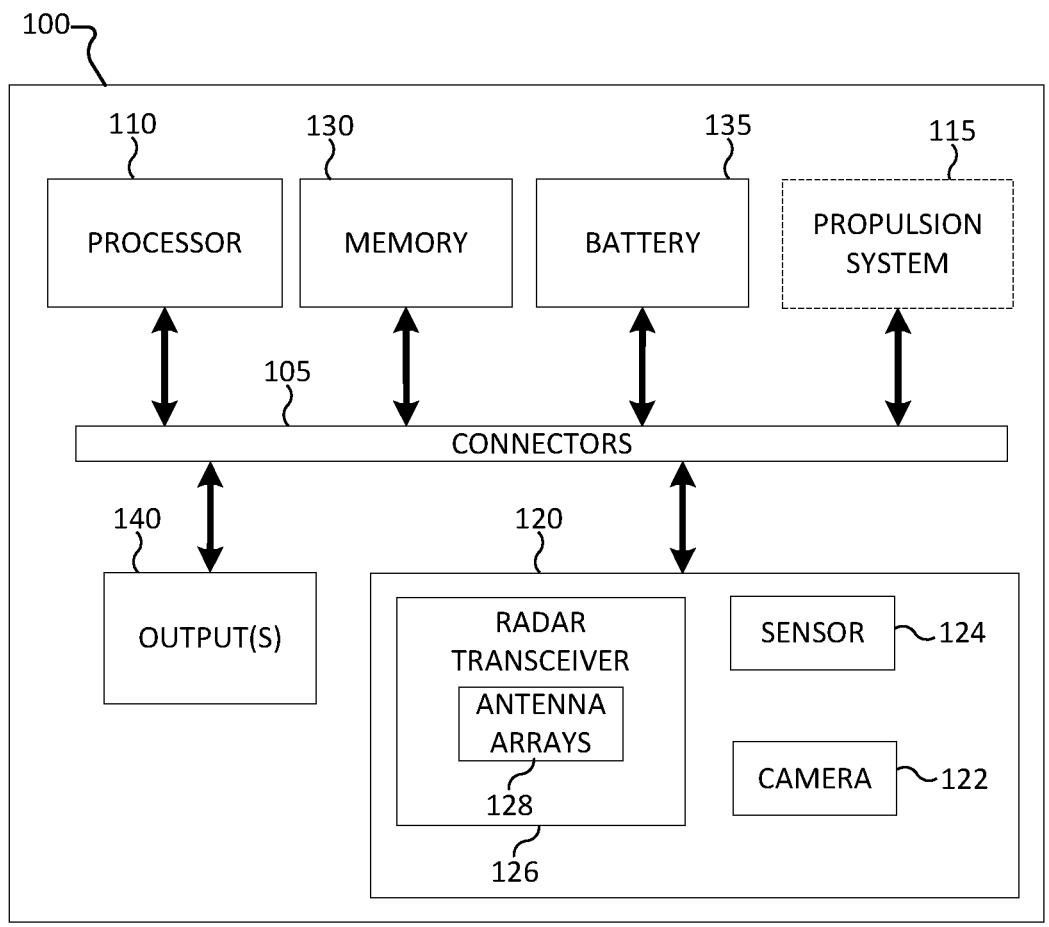
FIG. 1 illustrates a block diagram of components included in an electronic device in accordance with various embodiments of the present disclosure.

FIG. 1 illustrates a block diagram of components included in an electronic device 100 in accordance with various embodiments of the present disclosure. The embodiment of the electronic device 100 shown in FIG. 1 is for illustration only. Other embodiments can be used without departing from the scope of the present disclosure.

As shown in FIG. 1, the electronic device 100 includes connectors 105, which support connections and/or communication between a processor 110, one or more modules 120, a memory 130, a battery 135, and one or more outputs 140. For example, without limitation, the connectors 105 can be wires, a circuit board, a bus, a universal serial bus (USB) port, or any other suitable type of connector for providing an electrical connection between components in the electronic device 100.

The processor 110 executes instructions that can be loaded into a memory 130. The processor 110 can include any suitable number(s) and type(s) of processors or other devices in any suitable arrangement. Example types of processor 110 include microprocessors, microcontrollers, digital signal processors, field programmable gate arrays, application specific integrated circuits, and discreet circuitry. The processor 110 can be a general-purpose CPU or specific purpose processor. Embedded software also runs on the processor 110 to collect the data from the one or more modules 120 and stream data to cloud service or a user's device.

In some embodiments, the electronic device 100 can include a propulsion system 115. For example, the electronic device 100 can be a self-propelled device such as a robot or a vacuum cleaner that is propelled by the propulsion system 115. The propulsion system 115 can provide movement of the electronic device 100 in all directions. In some embodiments, the propulsion system 115 includes wheels and motor(s) that rotate the wheels to control movement of the electronic device 100. In various embodiments, such as embodiments where the electronic device 100 is a mobile phone or tablet, the electronic device 100 does not include the propulsion system 115.

The one or more modules 120 can include a variety of modules, including but not limited to a camera 122, one or more sensors 124, and one or more transceivers 126. Although described herein as including the camera 122, sensors 124, and one or more transceivers 126, this embodiment should not be construed as limiting and more or fewer modules can be included.

The camera 122 can be any type of camera utilized to capture images of an environment surrounding the electronic device 100. In some embodiments, one or more additional cameras 122 can be included to face in different direction. For example, the electronic device 100 can have up to possibly 360 degree field of view if, for example, two or more cameras are used. For example, without limitation, the camera 122 can be a high definition (HD) camera, a wide angle camera (e.g., to permit 180 degree angle of view), multiple angle cameras (e.g., to provide a 360 degree angle of view) an infrared camera, a red-blue-green (RGB) camera, etc.

The sensor(s) 124 can include various sensors to detect information regarding the electronic device 100 or the environment surrounding the electronic device 100. For example, the sensor 124 can include one or more of an odometer, accelerometer, and gyro sensor to measure a distance traveled, speed, and rotation, respectively, of the electronic device 100. In some embodiments, the processor 110 can utilize data obtained from the sensor 124 to determine a motion state of the electronic device 100. For example, the processor 110 can determine the electronic device 100 is in a motion state that includes any amount of movement, a motion state that includes a speed above a threshold value, a motion state that includes a speed below a threshold value, or a static state that indicates the electronic device 100 is not currently in motion. In other embodiments, the processor 110 can determine that the electronic device 100 is in a transition state between motion states.

The transceiver 126 can be a radar transceiver and include an antenna array 128 including a transmitter and receiver. The transmitter can transmit millimeter wave (mmWave) signals at a frequency less than or equal to 100 GHz. For example, the transmitter antenna array can transmit mmWave signals at a frequency of 60 GHz. The receiver can receive the mmWave signals originally transmitted from the transmitter after the mmWave signals have bounced or reflected off of target objects in the surrounding environment of the electronic device 100. The processor 110 can analyze the time difference between when the mmWave signals are transmitted and received to measure the distance of the target objects from the electronic device 100. The measured distance of target objects can then be used in simultaneous localization and mapping (SLAM) operations as well as navigation of the electronic device 100 through the environment.

The memory 130 represents any structure(s) capable of storing and facilitating retrieval of information (such as data, program code, and/or other suitable information on a temporary or permanent basis). The memory 130 can represent a random access memory or any other suitable volatile or non-volatile storage device(s), including, for example, a read-only memory, hard drive, or Flash memory.

The battery 135 provides power to the various components and can include one or more induction charging coils. For example, the battery 135 can include or be connected to an induction charging coil to charge battery wirelessly.

The output(s) 140 provide feedback, control, and/or visual signals to persons and/or objects in proximity to the electronic device 100. For example, the output(s) 140 can sound alerts, display lights or video, or generate signals to wirelessly control external objects. Example type of output(s) 140 that can be included within the electronic device 100 include speaker(s), light(s), laser pointer(s), a video projector, a remote controller (e.g., such as an IR or RF remote controller), a display (e.g., LCD or LED display), etc. For example, the electronic device 100 can provide an alert via sounds or lights (e.g., dutiable or visual alerts) generated by the output(s) 140 when a certain condition is automatically recognized, at a certain time, or upon receipt of a request from the user application.

As noted above, the transceiver 126 includes one or more antenna arrays 128 including a receiver in close proximity to a transmitter as well as other receivers and transmitters. The close proximity, in addition to mmWave signals bouncing or reflecting off of non-target objects, can result in leakage of a signal that is received by the receiver. Based on the received signals, the processor 110 creates a response metric such as a channel impulse response (CIR). The CIR is a measurement of the response to a transmitted signal. For example, the CIR may be a measure of amplitude and/or phase of a reflected signal as a function of distance. For example, the CIR can be computed differently for different types of radar, such as for a pulsed radar operation, CIR can be a measure of the strength of reflected signal as a function of distance. In pulse compression radars, for instance those using Golay sequences, CIR can be computed by using a Golay matched filter. For example, a CIR can be illustrated where the X-axis represents tap index (a measure of distance) and the Y-axis represents amplitude of CIR. In the CIR, leakage can be represented as peaks where there is in fact no object at the particular location of the peak. When the peak leakage has an amplitude that is significantly higher than the amplitude of the targets under consideration, the problem of separating leakage peaks from the target peaks in the CIR profiles can be difficult. Although depicted herein as a CIR, various types of metrics can be used herein to illustrate the reflected signal. For example, for frequency-modulated continuous wave (FMCW) radars a possible metric can be generated using the intermediate frequency signal derived after low pass filter of the product of transmit and received signal and further sampled using ADC.

Accordingly, the present disclosure includes devices and methods of motion assisted leakage removal for radar applications. In particular, the present disclosure describes devices and methods of removing leakage from the CIR based on measured and stored leakage based on a motion state of the electronic device 100. Various embodiments of the present disclosure can be applied when the electronic device 100 is in an unfamiliar environment and therefore is unable to draw from prior knowledge of the environment or prior knowledge of certain targets in the environment to remove leakage, accurately detect targets, and apply the detected locations of detected targets into a navigation system.

As described herein, the electronic device 100 can be any device suitable for radar applications at mmWave frequencies. For example, the electronic device 200 can be a smart phone, a tablet, a wearable device such as a smart watch or augmented reality headset, an automated robot, or any other suitable device that can apply radar applications at mmWave frequencies. In various embodiments, radar applications can be applied to facial detection. Facial detection can be used as a security measure to prevent access to the electronic device 200 by anyone who is not an authorized user of the electronic device 200. The electronic device 200 can be used to store results of the facial detection in the memory 230 and/or transmit the results of the facial detection to an external electronic device.

In another embodiment, the electronic device 100 can be an automated domestic or social robot, such as an automated robot cleaner, capable of performing navigation in an unfamiliar environment. In particular, the electronic device 100 can perform navigation in an environment without the assistance of any prior knowledge of the environment or location of target objects in the environment. For example, the transceiver 126 can transmit and receive mmWave signals that are analyzed by the processor 110 to remove leakage and more accurately detect target objects.

Figure 2:
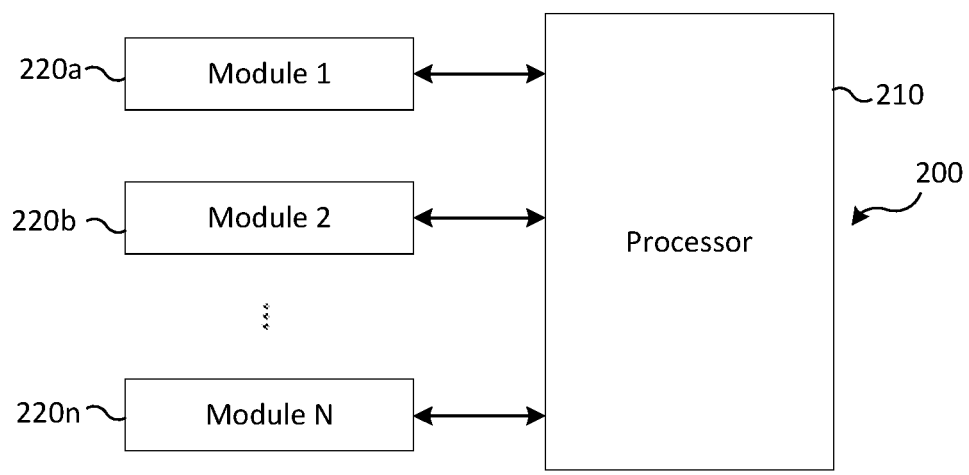
FIG. 2 illustrates an electronic device according to various embodiments of the present disclosure.

FIG. 2 illustrates an electronic device according to various embodiments of the present disclosure. The electronic device 200 can be the electronic device 100. For example, the electronic device 200 can be a communication device such as a smart phone or a self-propelled navigation device.

The electronic device 200 can include a processor 210 and modules 220. The processor 210 can be connected to at least one module 220 and a storage component, such as the memory 130, that stores intermediate and/or final data computed by the processor 210. In particular, the processor 210 can receive data from the modules 220 and separate the contribution of leakage from the contribution of target objects in the field of view of the radar to the CIR profile obtained from the module 220 in the radar. By separating the contribution of leakage from the contribution of target objects, the processor 210 can remove leakage from the CIR to provide a more accurate CIR profile. In some embodiments, the module 220 can include some or all of the components of the baseband module 120, but the module 220 is not limited herein.

The module 220 can include any number of modules including module 1 220a, module 2 220b, and module n 220n. The at least one module 220 can include one or more cameras, an odometer sensor, an accelerometer, or any other suitable module to estimate motion of the device in order to allow the processor 210 to more accurately remove leakage from the CIR to provide a more accurate CIR profile.

In embodiments where the electronic device 200 is a mobile phone, the processor 210 and the modules 220 can be utilized to generate a CIR that it used for facial detection of a user.

In embodiments where the electronic device 200 is the electronic device 100, the processor 210 can be the processor 110 and the modules 220 can be the one or more modules 120. For example, the modules 220 can include the camera 122, the sensor 124, and the transceiver 126 including the antenna array 128 and be used for navigation of the electronic device 200.

Figure 3:
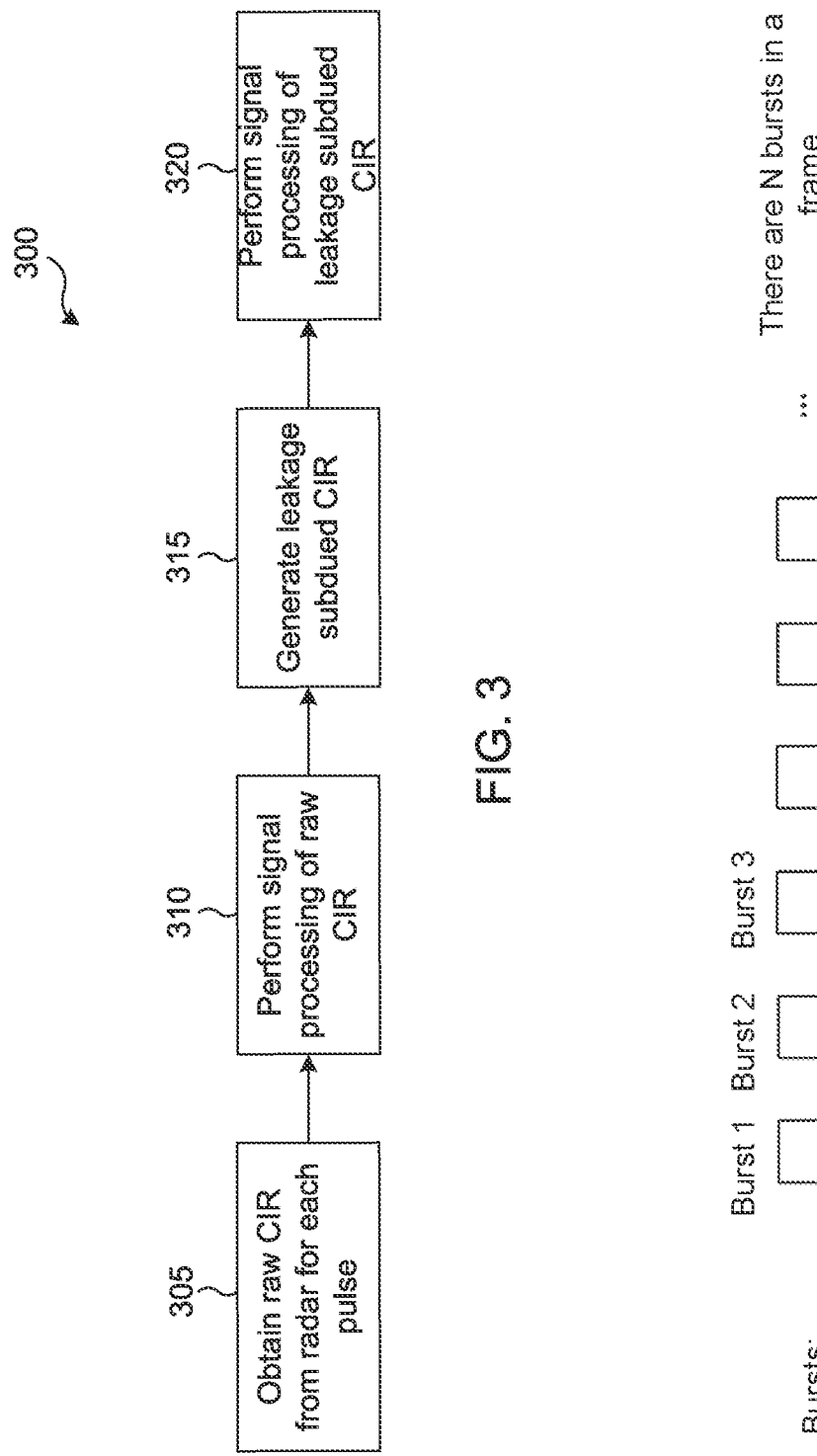
FIG. 3 illustrates a method of determining signal leakage according to various embodiments of the present disclosure.

FIG. 3 illustrates a method of determining signal leakage according to various embodiments of the present disclosure. For example, FIG. 3 depicts an example method of determining signal leakage that can be executed by the processor 210 and modules 220 illustrated in FIG. 2.

In operation 305, the processor 210 creates a raw CIR (CRAW) from a radar for each pulse. For example, the processor 210 can control a radar transceiver, such as the transceiver 126, to transmit and receive mmWave signals in a series of pulses or bursts. As each mmWave signal is transmitted and received, raw CIR is obtained from each pulse. In various embodiments, the raw CIR can include an x-axis that denotes distance, for example a tap index, and a y-axis that denotes an amplitude or any representation of a complex number of CIR. Each pulse provides the processor 210 with a data point of a distance and amplitude from the electronic device, such as the electronic device 200.

In operation 310, the processor 210 performs signal processing of the raw CIR obtained in operation 305. Signal processing includes separating leakage peaks from target objects peaks for each pulse transmitted and received. The amplitude of the raw CIR can include various peaks that correspond to target objects as well as peaks that do not correspond to target objects but are illustrated based on leakage. In some embodiments, the peaks that correspond to leakage can be smaller than the peaks that correspond to target objects, the same size as the peaks that correspond to target objects, or greater than the peaks that correspond to target objects. Because the peaks corresponding to leakage can be the same size or greater than the peaks that correspond to target objects, separating the peaks corresponding to leakage from the peaks that correspond to target objects can be difficult. Various methods of signal processing of raw CIR are described throughout the present disclosure. For example, non-limiting descriptions of signal processing are described in operation 515, operation 615, and throughout FIG. 7.

In operation 315, the processor 210 can generate a leakage subdued CIR. In some embodiments, the processor 210 can generate the leakage subdued CIR based on determining a difference between the CIR in a first motion state and a second motion state. In other embodiments, the processor 210 can generate the leakage subdued CIR by applying a previously generated and saved baseline CIR that depicts which peaks correspond to leakage. In some embodiments, the generated leakage subdued CIR can be stored in the memory 130 as a filter that can be applied to raw CIR that is generated at a later time to more efficiently detect target objects in the surrounding environment.

In operation 320, the processor 210 can perform signal processing of the leakage subdued CIR. For example, based on the target objects remaining in the leakage subdued CIR, the processor 210 can perform target detection and target tracking.

Figure 4:
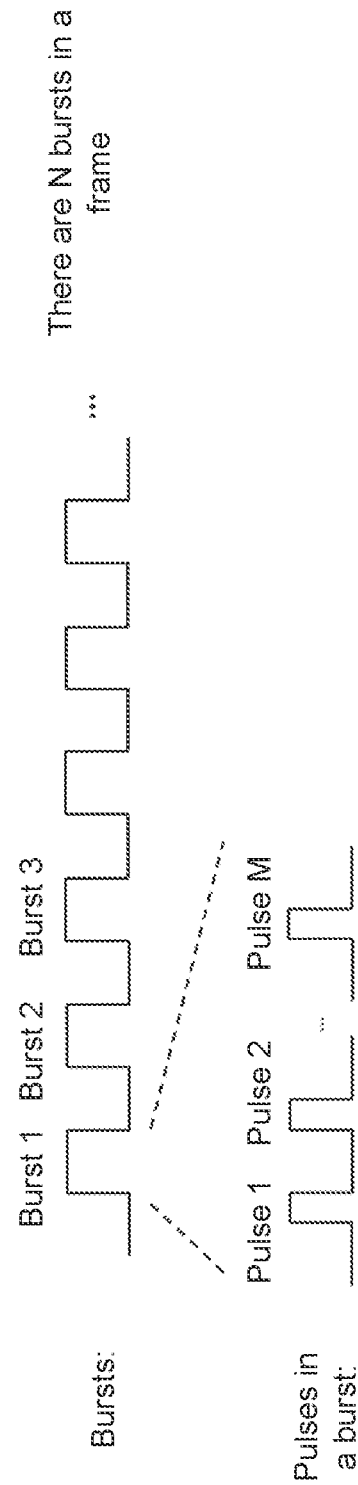
FIG. 4 illustrates a timing diagram for radar transmission according to various embodiments of the present disclosure.

FIG. 4 illustrates a timing diagram for radar transmission according to various embodiments of the present disclosure. In particular, FIG. 4 illustrates a frame structure that divides time into frames that each comprises multiple bursts. Each burst includes a plurality of pulses. As illustrated in FIG. 4, each frame includes a number N bursts, such as Burst 1, Burst 2, Burst 3, etc. Each burst further includes a plurality of pulses. For example, FIG. 4 illustrates that Burst 1 comprises a plurality of pulses referenced as Pulse 1, Pulse 2, etc. through Pulse M. The raw CIR profile obtained by the frame structure illustrated in FIG. 4 can be the result of operations 305 and 310 illustrated in FIG. 3.

For example, in Burst 1 a radar transceiver, such as the transceiver 126, can transmit Pulse 1, Pulse 2, and Pulse M. In Burst 2, the radar transceiver 126 can transmit similar pulses Pulse 1, Pulse 2, and Pulse M. Each different pulse (Pulse 1, Pulse 2, and Pulse M) and burst (Burst 1, Burst 2, Burst 3, etc.) can utilize a different transmission/reception antenna configuration to identify the specific pulses and bursts. For example, each pulse or burst can utilize a different active set of antenna elements and corresponding analog/digital beamforming weights to identify specific pulses and bursts.

Following each frame, the processor, such as the processor 110, connected to the transceiver obtains a raw CIR profile. In some embodiments, the raw CIR profile can be a three-dimensional matrix populated with complex numbers that denote the strength of the CIR. In these embodiments, the first dimension can correspond to a burst index, the second dimension can correspond to a pulse index, and the third dimension can correspond to a tap index that measures the range or time of flight of the received signal.

Figure 5:
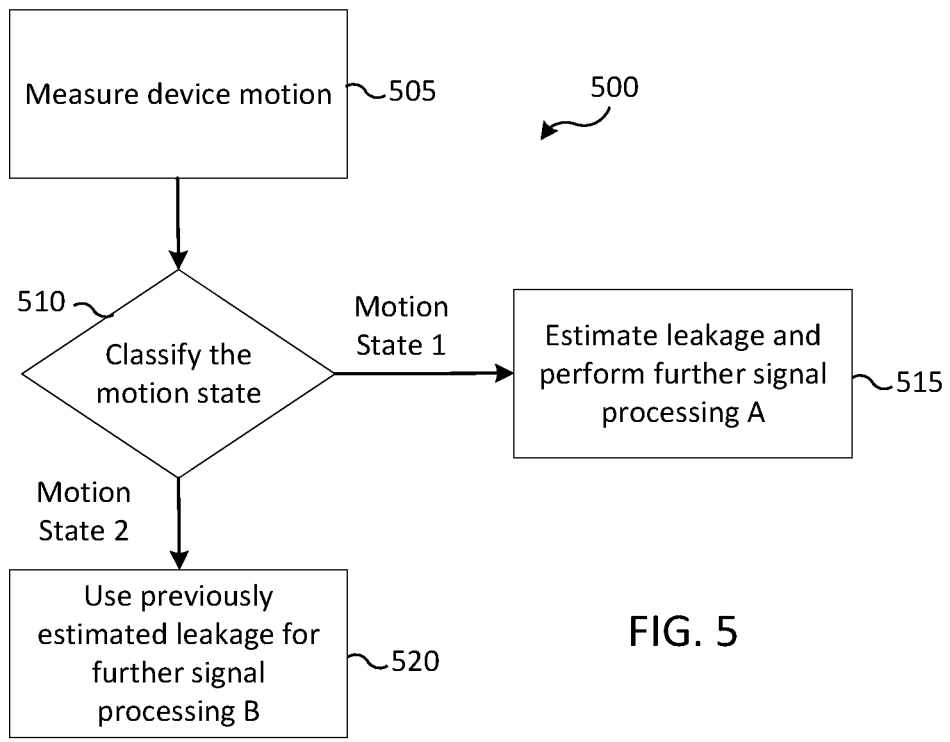
FIG. 5 illustrates a method of motion assisted leakage cancelation according to various embodiments of the present disclosure.

FIG. 5 illustrates a method of motion assisted leakage cancelation according to various embodiments of the present disclosure. For example, FIG. 5 depicts an example method 500 of motion assisted leakage cancelation that can be executed by the processor 110, transceiver 126, and modules 120 illustrated in FIG. 1.

In operation 505, the motion of an electronic device, for example the electronic device 100, is measured by module 120. For example, the module 120 can include an accelerometer 124 that measures a speed of the electronic device 100 at a particular time.

In operation 510, the processor 110 classifies the motion state of the electronic device 100 based on the data obtained by the accelerometer 124. The processor 110 can classify the motion state as either motion state 1 or motion state 2. In some embodiments, motion state 1 can refer to a state in which the electronic device 100 is in motion and motion state 2 can refer to a state in which the electronic device 100 is static. In other embodiments, motion state 1 can refer to a state in which the electronic device 100 is in motion at a speed above a threshold value and motion state 2 can refer to a state in which the electronic device 100 is in motion at a speed less than the threshold value. The motion states can further include one or more sub-states. For example, motion state 1 can include a sub-state that corresponds to a certain angular and linear velocity of the radar. Although depicted herein as an electronic device 100 that is static, in motion, or in motion at a particular speed, other embodiments are also possible. For example, in embodiments where the electronic device 100 is a smart phone, tablet, or other electronic device, motion state 1 can refer to a state when the electronic device 100 is being held by a user and motion state 2 can refer to a state where the electronic device 100 is not held by a user and placed on an inanimate, static object such as a table or other surface. Although the electronic device 100 is depicted herein as being in motion state 1 or motion state 2, other embodiments are possible. For example, the electronic device 100 can be determined to be in motion state 1, motion state 2, or motion state 3 where motion state 1 refers to motion of the electronic device at a speed above a threshold value, motion state 2 refers to motion of the electronic device at a speed at or below a threshold value, and motion state 3 refers to a static state of the electronic device. Other embodiments can include motion states referring to a power of the electronic device 100 being on or off.

In operation 515, based on the motion state being classified as motion state 1 in operation 510, the processor 110 estimates leakage and performs further signal processing A. For example, if motion state 1 corresponds to a moving state, the processor 110 can estimate leakage CIR from the raw CIR obtained from the radar and use the estimated leakage CIR to perform the further signal processing A. For example, the processor 110 can obtain a raw CIR profile from the radar that is denoted as CRAW=CLEAK+CTARGET, where CLEAK is the CIR contribution from leakage and CTARGET is the CIR contribution from desired targets. In motion state 1, CLEAK and CTARGET can have different statistical properties across time. For example, CTARGET can significantly change with time while in motion state 1 but CLEAK can change comparatively slowly in motion state 1. More particularly, a peak of a target object can change a corresponding tap index with time while a leakage peak can be stationary. As the electronic device 100 moves, an amplitude of a signal of the target object as well as the tap index can change, indicating that the peak is reflected off a legitimate target object. In contrast, as the electronic device 100 moves, neither the amplitude nor the tap index changes, indicating that the peak is due to leakage rather than being reflected off of a legitimate target object. The estimated leakage can then be stored in the memory 130 as an estimated leakage profile to be applied to raw CIR data by the processor 110.

In operation 520, based on the motion state being classified as motion state 2 in operation 510, the processor 110 uses previously estimated leakage for further signal processing B. For example, the processor 110 can apply the estimated leakage profile obtained in operation 515 to raw CIR data to estimate a leakage subdued CIR.

In various embodiments, the difference between motion state 1 and motion state 2 can be expressed as a representation of the Doppler shift between motion state 1 and motion state 2. The Doppler shift corresponds to a velocity estimate based on the received CIR. In motion state 1, for example as the electronic device 100 is in motion with respect to the target objects, the Doppler shift is large for target objects and smaller for leakage components. In motion state 2, for example when the electronic device 100 is static, the processor 110 cannot distinguish between the target and leakage components of the CIR based on a Doppler shift because the lack of significant motion of the electronic device 100 results in a lack of Doppler shift. Therefore, in operation 520, the processor 110 applies the estimated leakage obtained in operation 515 to the CIR while the electronic device 100 is in motion state 2.

The methods of motion assisted leakage removal described herein can be detected and utilized in a variety of situations. For example, motion assisted leakage removal can be detected if radar performance in terms of target detection varies in different motion states. Motion assisted leakage removal can be detected if the electronic device 100 has a poor performance at startups before any motion is performed and the performance improves after the electronic device 100 initiates motion. Motion assisted leakage removal can be detected if the electronic device 100 performance deteriorates with time in the static state, after which the electronic device 100 vibrates and/or initiates a small amount of motion before becoming static again and the target detection performance improves after the vibration or initiation of a small amount of motion.

Figure 6:
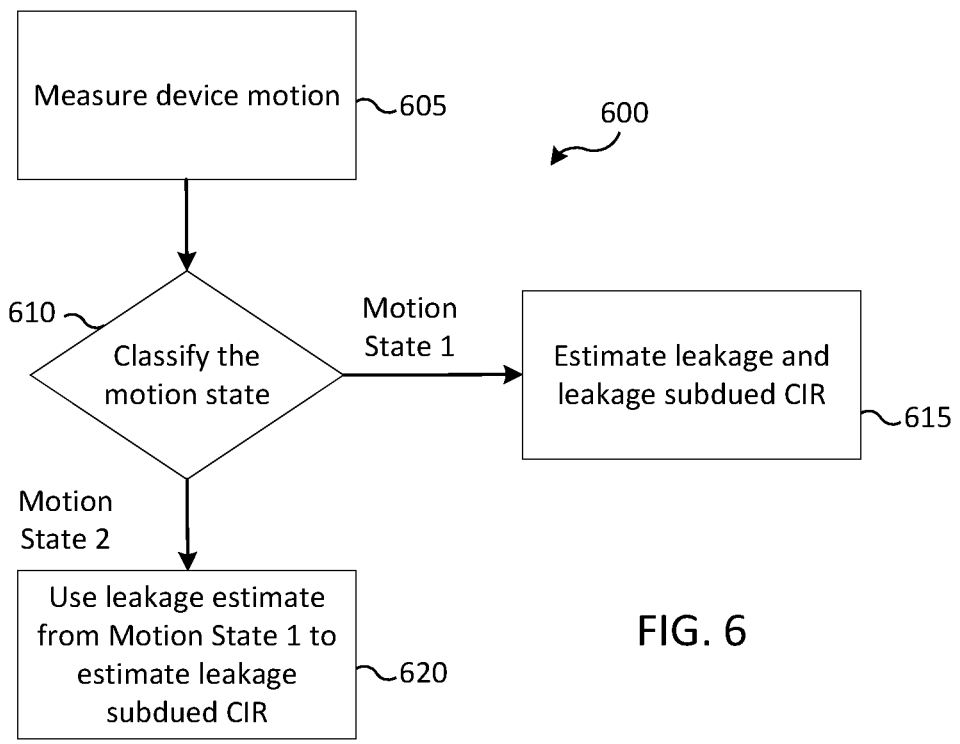
FIG. 6 illustrates a method of motion assisted leakage cancelation according to various embodiments of the present disclosure.

FIG. 6 illustrates a method of motion assisted leakage cancelation according to various embodiments of the present disclosure. For example, FIG. 6 depicts an example method 600 of motion assisted leakage cancelation that can be executed by the processor 110, transceiver 126, and modules 120 illustrated in FIG. 1.

In operation 605, the motion of an electronic device, for example the electronic device 100, is measured by module 120. For example, the module 120 can include an accelerometer 124 that measures a speed of the electronic device 100 at a particular time.

In operation 610, the processor 110 classifies the motion state of the electronic device 100 based on the data obtained by the accelerometer 124. The processor 110 can classify the motion state as either motion state 1 or motion state 2. The motion state 1 and motion state 2 can be the same as motion state 1 and motion state 2 that are classified in operation 510.

In operation 615, based on the motion state being classified as motion state 1 in operation 610, the processor 110 estimates leakage and the leakage subdued CIR. In some embodiments, estimating leakage and leakage subdued CIR can be the further signal processing A performed in operation 515.

In operation 620, based on the motion state being classified as motion state 2 in operation 610, the processor 110 uses the previously estimated leakage from motion state 1 to estimate leakage subdued CIR. For example, when the raw CIR profile is denoted as CRAW=CLEAK+CTARGET, CRAW represents input CIR profile before leakage cancellation. CLEAK_EST corresponds to leakage CIR profile estimated in motion state 1. CTARGET_EST corresponds to the CIR profile after leakage cancelation, such that CTARGET_EST can be obtained by performing a subtraction operation CTARGET_EST=CRAW-CLEAK_EST or any other method that takes input as at least CTARGET_EST and CRAW to produce an estimate CLEAK. The method of estimation of leakage subdued CIR in further signal processing A and the method of estimation of leakage subdued CIR in further signal processing B can or cannot be the same.

Figure 7:
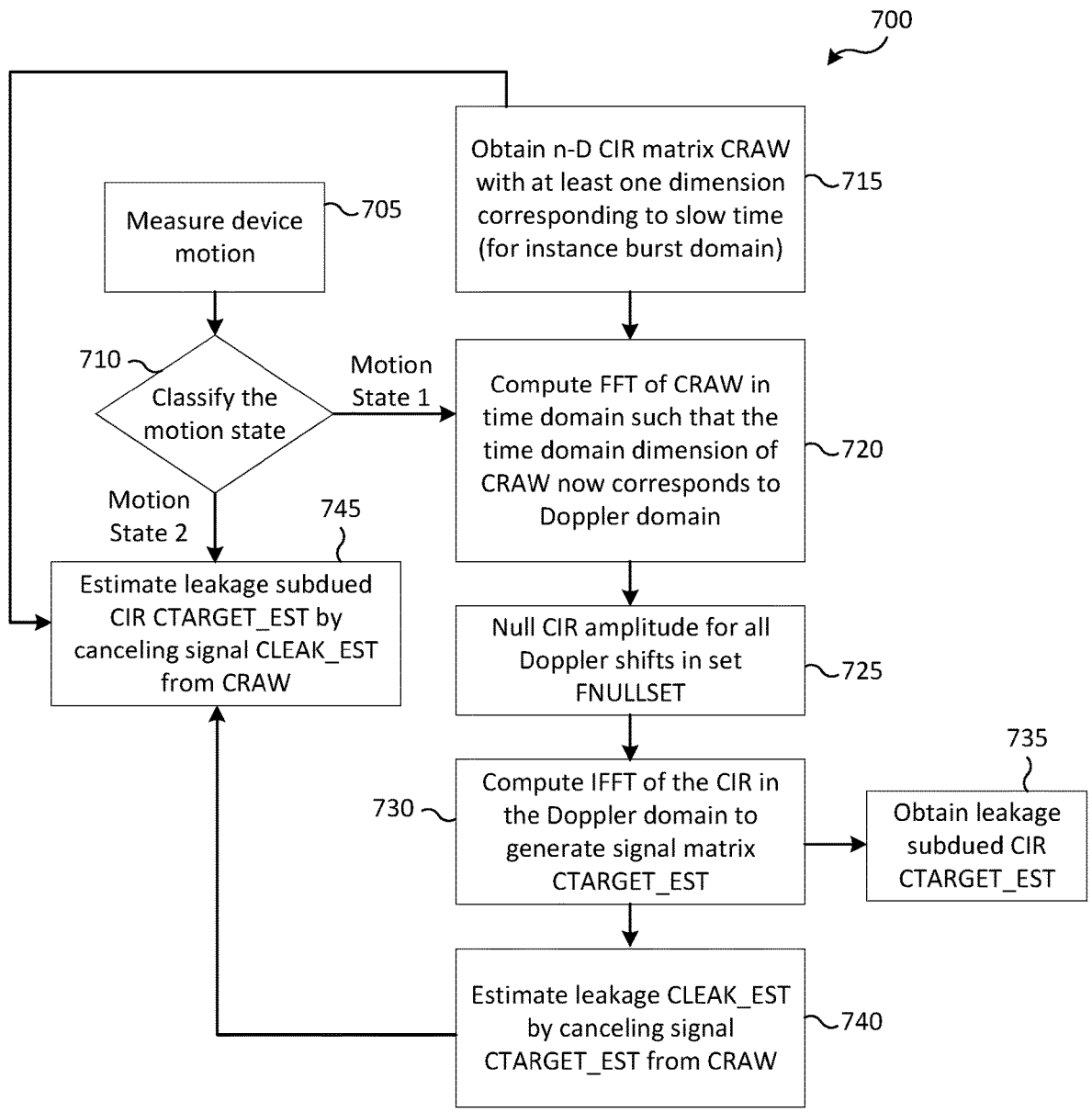
FIG. 7 illustrates a method of motion assisted leakage cancelation according to various embodiments of the present disclosure.

FIG. 7 illustrates a method of motion assisted leakage cancelation according to various embodiments of the present disclosure. For example, FIG. 7 depicts an example method 700 of motion assisted leakage cancelation that can be executed by the processor 110, transceiver 126, and modules 120 illustrated in FIG. 1.

In operation 705, the motion of an electronic device, for example the electronic device 100, is measured by module 120. For example, the module 120 can include an accelerometer 124 that measures a speed of the electronic device 100 at a particular time.

In operation 710, the processor 110 classifies the motion state of the electronic device 100 based on the data obtained by the accelerometer 124. The processor 110 can classify the motion state as either motion state 1 or motion state 2. The motion state 1 and motion state 2 can be the same as motion state 1 and motion state 2 that are classified in operation 510. If the motion state is classified as motion state 1, the processor 110 proceeds to operation 720. If the motion state is classified as motion state 2, the processor 110 proceeds to operation 745.

In operation 715, the processor 110 obtains a CIR matrix CRAW. The CRAW can have n-dimensions and at least one dimension corresponds to the time domain. For example, the time domain can be a burst described in the description of FIG. 4. In some embodiments, the time domain in operation 715 can be slow time. As described in the descriptions of FIGS. 5 and 6, the CRAW is a raw CIR matrix obtained from the radar transceiver 126 followed by processing by the processor 110.

In operation 720, based on the motion state being classified as motion state 1 in operation 710, the processor 110 computes a Fourier transform, which can use a fast Fourier transform (FFT) operation of CRAW in the time dimension based on the n-D CIR matrix CRAW obtained in operation 715. In operation 720, the time dimension can be referred to as a Doppler dimension (or Doppler domain). Although described herein as an example method for Fourier transform computation, FFT is merely an example of Fourier transform computation and this example should not be construed as limiting. Other methods for computing Fourier transform can also be used.

In operation 725, the processor 110 nulls out the CIR amplitude that corresponds to all Doppler shifts in a particular full null set (FNULLSET). Nulling can include setting the corresponding CIR responses to zero or to a small value. In some embodiments, a FNULLSET can correspond to a set with a single entry that corresponds to zero Doppler shift.

In operation 730, after the processor 110 nulls out the CIR amplitude that corresponds to all Doppler shifts in a particular FNULLSET, the processor 110 computes an inverse FFT (IFFT) of the CIR in a Doppler domain. By computing the IFFT of the CIR in the Doppler domain, the processor 110 can generate a signal matrix CTARGET_EST. In some embodiments, the CTARGET_EST can be declared leakage free. In other embodiments, the CTARGET_EST can be declared to be a leakage subdued estimate of CIR (operation 735).

In operation 740, the processor 110 estimates leakage CLEAK_EST. To estimate leakage of the signal, the processor 110 cancels the generated CTARGET_EST from CRAW. In some embodiments, the processor 110 cancels the generated CTARGET_EST from CRAW by subtraction of the generated CTARGET_EST from CRAW to produce an estimated leakage CLEAK_EST. In some embodiments, the estimated leakage CLEAK_EST can be stored as a generated filter in the memory 130 to be used in leakage estimation at a later time, for example in target object detection, navigation, or simultaneous localization and mapping (SLAM).

In response to the motion state being classified as motion state 2 in operation 710, in operation 745 the processor 110 estimates leakage subdued CIR CTARGET_EST based on the estimated leakage CLEAK_EST filter obtained in operation 740 and n-D CIR matrix CRAW obtained in operation 715. To estimate the leakage subdued CIR CTARGET_EST, the processor 110 cancels the estimated leakage CLEAK_EST by applying the generated filter to the data from the CRAW. The CIR CTARGET_EST can then be used to accurately detect target objects and distinguish the detected target objects from false targets that can interfere with the navigation path of the electronic device 100.

Figure 8:
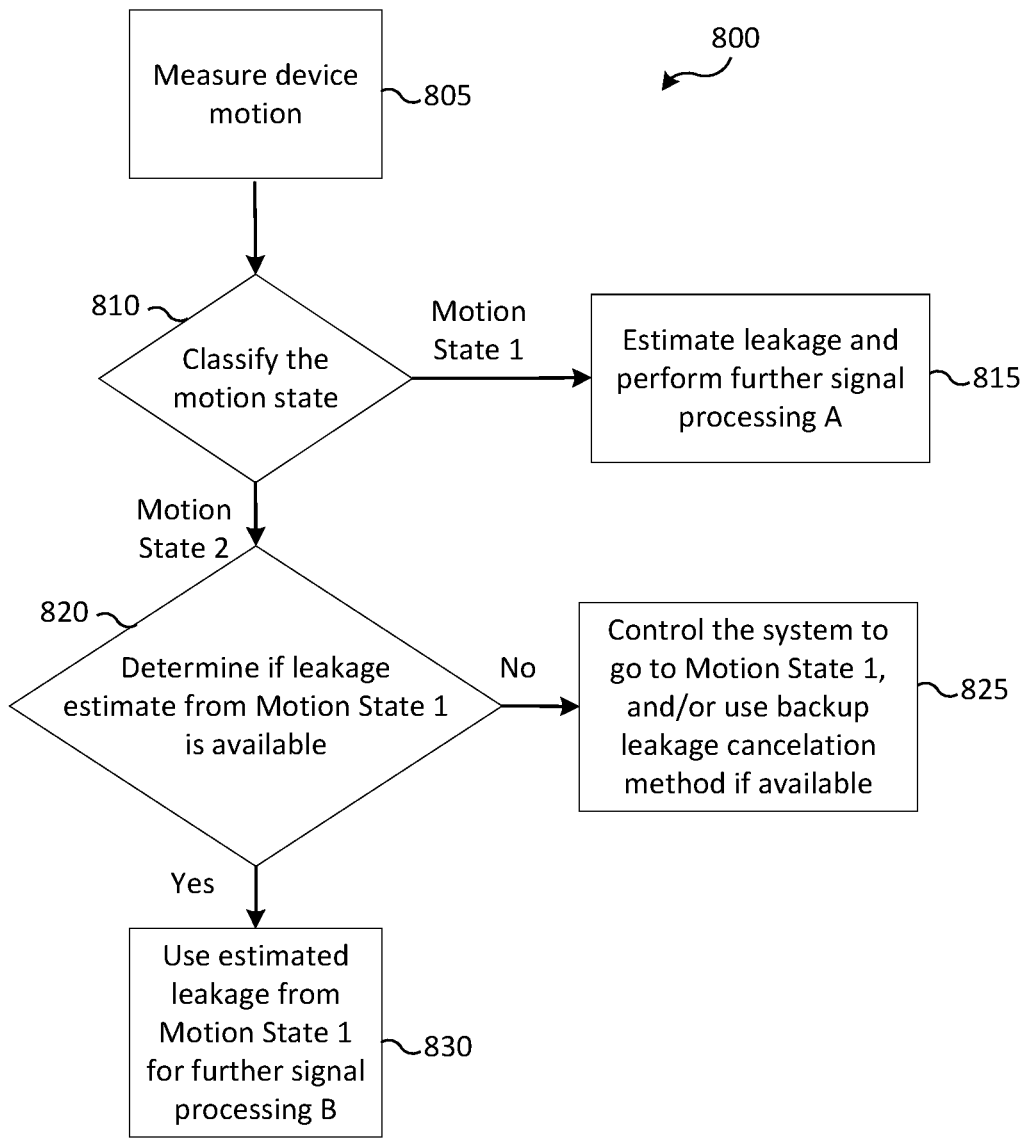
FIG. 8 illustrates a method of motion assisted leakage cancelation according to various embodiments of the present disclosure.

FIG. 8 illustrates a method of motion assisted leakage cancelation according to various embodiments of the present disclosure. For example, FIG. 8 depicts an example method 800 of motion assisted leakage cancelation that can be executed by the processor 110, transceiver 126, and modules 120 illustrated in FIG. 1.

In operation 805, the motion of an electronic device, for example the electronic device 100, is measured by module 120. For example, the module 120 can include an accelerometer 124 that measures a speed of the electronic device 100 at a particular time.

In operation 810, the processor 110 classifies the motion state of the electronic device 100 based on the data obtained by the accelerometer 124. The processor 110 can classify the motion state as either motion state 1 or motion state 2. The motion state 1 and motion state 2 can be the same as motion state 1 and motion state 2 that are classified in operation 510. If the motion state is classified as motion state 1, the processor 110 proceeds to operation 815. If the motion state is classified as motion state 2, the processor 110 proceeds to operation 820.

In operation 815, based on the motion state being classified as motion state 1 in operation 810, the processor 110 estimates leakage and performs further signal processing A. For example, the further signal processing A can be the further signal processing A described in operation 515. More particularly, if motion state 1 corresponds to a moving state, the processor 110 can estimate leakage CIR from the raw CIR obtained from the radar and use the estimated leakage CIR to perform the further signal processing A. For example, the processor 110 can obtain a raw CIR profile from the radar that is denoted as CRAW=CLEAK+CTARGET, where CLEAK is the CIR contribution from leakage and CTARGET is the CIR contribution from desired targets. In motion state 1, CLEAK and CTARGET can have different statistical properties across time. For example, CTARGET can significantly change with time while in motion state 1 but CLEAK can change comparatively slowly in motion state 1. More particularly, a peak of a target object can change a corresponding tap index with time while leakage peaks may remain stationary. For a fixed range tap of interest, the contribution of CTARGET to CRAW in terms of amplitude can drop significantly as the distance between the target and radar changes so as to now correspond to a new range tap in CIR profile. However, the contribution of CLEAK on the fixed tap of interest can have smaller variation in terms of the amplitude irrespective of the radar motion or environment change. The estimated leakage can then be stored in the memory 130 as an estimated leakage profile to be applied to raw CIR data by the processor 110.

In operation 820, based on the motion state being classified as motion state 2 in operation 810, the processor 110 determines whether a leakage estimate from motion state 1 is available. For example, the processor 110 can determine whether a previously generated filter generated based on motion from motion state 1 is stored in the memory 130 that can be applied to CRAW from motion state 2. If a leakage estimate from motion state 1 is available, the processor 110 proceeds to operation 825. If a leakage estimate from motion state 1 is not available, the processor 110 proceeds to operation 830.

In some embodiments, a generated filter including leakage estimates from motion state 1 are not available. For example, a previously generated filter can include a leakage estimate that has become stale based on the radar transceiver 126 being inactive for a predetermined amount of time or the radar transceiver 126 becoming hot and changing the leakage profile due to the temperature difference. In these embodiments, the processor 110 utilizes alternative methods to filter out leakage from the CIR.

For example, in response to determining that a previously generated filter including a leakage estimate from motion state 1 is not available, in operation 825 the processor 110 can trigger the electronic device to temporarily enter motion state 1 in order to estimate leakage and perform the further signal processing A of operation 815 or utilize backup leakage cancelation methods if available. When the processor 110 triggers the electronic device 100 to temporarily enter motion state 1, the processor 110 can execute a brief motion sequence that includes causing the electronic device 100 to vibrate or travel a minimal distance in order to estimate leakage and perform the further signal processing A. When the processor 110 determines that the electronic device 100 is in motion state 1, the processor 110 can estimate leakage and perform the further signal processing A of operation 815. Once the generated filter of signal processing A is obtained and the electronic device 100 is again classified as in motion state 2, in operation 820 the processor 110 determines that a filter including a leakage estimate from motion state 1 is available. An example backup leakage cancelation method is described below in reference to FIG. 9.

In operation 830, in response to determining the generated filter including the estimated leakage from motion state 1 is available, the processor 110 uses the estimated leakage from motion state 1 for further signal processing B. For example, the processor 110 can apply the generated filter including the estimated leakage profile obtained in operation 815 to raw CIR data to estimate a leakage subdued CIR.

Figure 9:
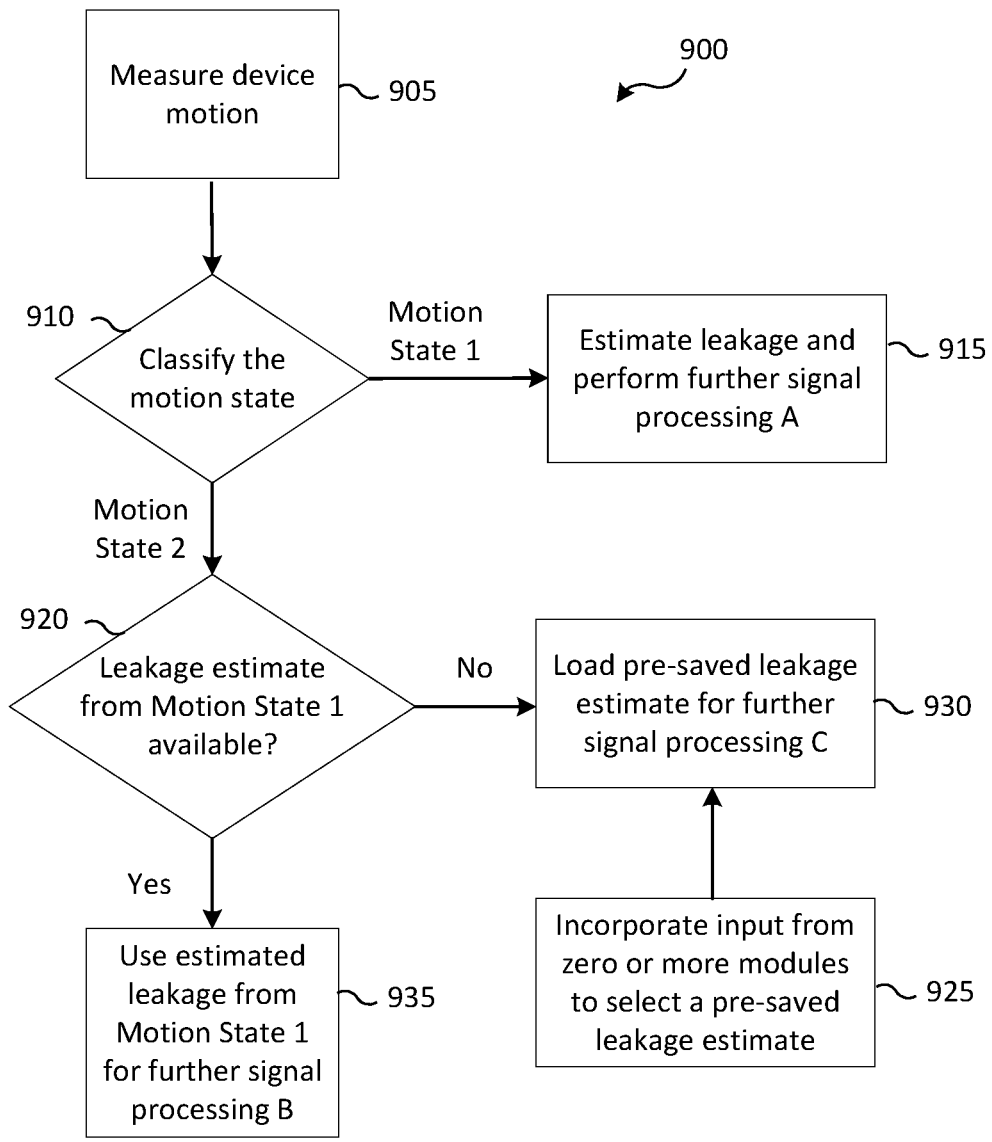
FIG. 9 illustrates a method of motion assisted leakage cancelation according to various embodiments of the present disclosure.

FIG. 9 illustrates a method of motion assisted leakage cancelation according to various embodiments of the present disclosure. For example, FIG. 9 depicts an example method 900 of motion assisted leakage cancelation that can be executed by the processor 110, transceiver 126, and modules 120 illustrated in FIG. 1. As illustrated in FIG. 9, operations 905 through 920 can be the same as operations 805 through 820 illustrated in FIG. 8. Further, operation 935 in FIG. 9 can be the same as operation 830 in FIG. 8.

In operation 905, the motion of an electronic device, for example the electronic device 100, is measured by module 120. For example, the module 120 can include an accelerometer 124 that measures a speed of the electronic device 100 at a particular time.

In operation 910, the processor 110 classifies the motion state of the electronic device 100 based on the data obtained by the accelerometer 124. The processor 110 can classify the motion state as either motion state 1 or motion state 2. The motion state 1 and motion state 2 can be the same as motion state 1 and motion state 2 that are classified in operation 510. If the motion state is classified as motion state 1, the processor 110 proceeds to operation 915. If the motion state is classified as motion state 2, the processor 110 proceeds to operation 920.

In operation 915, based on the motion state being classified as motion state 1 in operation 910, the processor 110 estimates leakage and performs further signal processing A. For example, the further signal processing A can be the further signal processing A described in operation 515. More particularly, if motion state 1 corresponds to a moving state, the processor 110 can estimate leakage CIR from the raw CIR obtained from the radar and use the estimated leakage CIR to perform the further signal processing A. For example, the processor 110 can obtain a raw CIR profile from the radar that is denoted as CRAW=CLEAK+CTARGET, where CLEAK is the CIR contribution from leakage and CTARGET is the CIR contribution from desired targets. In motion state 1, CLEAK and CTARGET can have different statistical properties across time. For example, CTARGET can significantly change with time while in motion state 1 but CLEAK can change comparatively slowly in motion state 1. More particularly, a peak of a target object can change a corresponding tap index with time while a leakage peak is stationary. As the electronic device 100 moves, an amplitude of a signal of one or more of the target object and the tap index changes, indicating that the peak is reflected off a legitimate target object. In contrast, as the electronic device 100 moves, neither the amplitude nor the tap index changes, indicating that the peak is due to leakage rather than being reflected off of a legitimate target object. The estimated leakage can then be stored in the memory 130 as an estimated leakage profile to be applied to raw CIR data by the processor 110.

In operation 920, based on the motion state being classified as motion state 2 in operation 910, the processor 110 determines whether a leakage estimate from motion state 1 is available. For example, the processor 110 can determine whether a previously generated filter generated based on motion from motion state 1 is stored in the memory 130 that can be applied to CRAW from motion state 2. If a leakage estimate from motion state 1 is available, the processor 110 proceeds to operation 935. If a leakage estimate from motion state 1 is not available, the processor 110 proceeds to operation 930.

In operation 925, the processor 110 can incorporate inputs from zero or more modules to select a pre-saved leakage estimate. In various embodiments, the pre-saved leakage estimate can be stored in the memory 130. For example, at least one module 120 can be configured to estimate a location of the electronic device 100 by using a global positioning system (GPS). The processor 110 can utilize the location information obtained from the at least one module 120 to select a filter including a leakage estimate for the particular location. In another embodiment, when the at least one module 120 is the camera 122, the processor 110 can obtain image data retrieved by the camera 122 to determine target objects in the environment surrounding the electronic device 100. In these embodiments, the processor 110 can utilize the image data to select a filter including a leakage estimate for the particular location that is the same as or similar to the image data retrieved by the camera 122 for the particular environment. In some embodiments, the at least one module 120 can include both the GPS module and camera 122 to coordinate target objects identified by image data captured by the camera 122 with the location information obtained from the GPS module. In various embodiments, the pre-saved leakage estimate can be stored in the memory 130 as a backup leakage estimation.

In operation 930, the processor 110 loads a pre-saved filter including a leakage estimate to be applied using further signal processing C. The further signal processing C can include applying the pre-saved filter retrieved in operation 925 to raw CIR data obtained by the radar transceiver 126 while the electronic device 100 is in motion state 2 to accurately detect target objects and distinguish the detected target objects from false targets that can interfere with the navigation path of the electronic device 100 without the electronic device 100 changing the motion state.

In operation 935, in response to determining the generated filter including the estimated leakage from motion state 1 is available, the processor 110 uses the estimated leakage from motion state 1 for further signal processing B. For example, the processor 110 can apply the generated filter including the estimated leakage profile obtained in operation 915 to raw CIR data to estimate a leakage subdued CIR. The estimated leakage subdued CIR can be used to accurately detect target objects and distinguish the detected target objects from false targets that can interfere with the navigation path of the electronic device 100.

Figure 10:
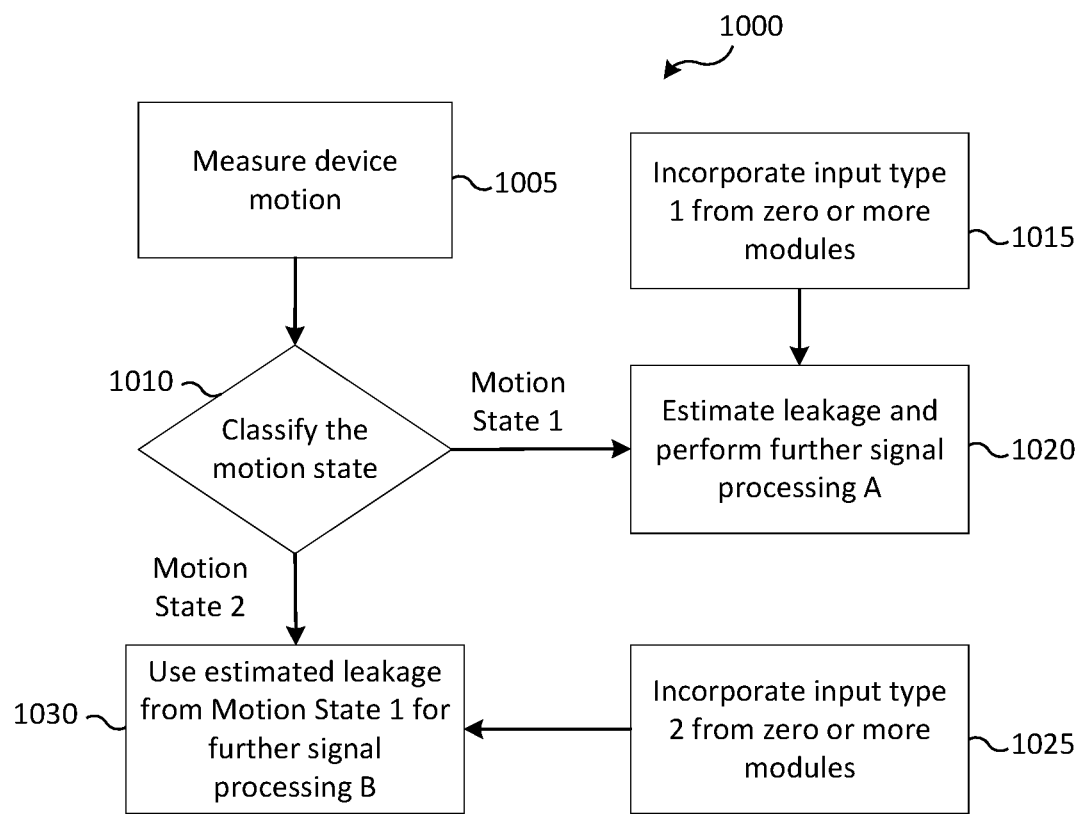
FIG. 10 illustrates a method of motion assisted leakage cancelation according to various embodiments of the present disclosure.

FIG. 10 illustrates a method of motion assisted leakage cancelation according to various embodiments of the present disclosure. For example, FIG. 10 depicts an example method 1000 of motion assisted leakage cancelation that can be executed by the processor 110, transceiver 126, and modules 120 illustrated in FIG. 1. As illustrated in FIG. 10, operations 1005 and 1010 can be the same as operations 805 and 810 illustrated in FIG. 8.

In operation 1005, the motion of an electronic device, for example the electronic device 100, is measured by module 120. For example, the module 120 can include an accelerometer 124 that measures a speed of the electronic device 100 at a particular time.

In operation 1010, the processor 110 classifies the motion state of the electronic device 100 based on the data obtained by the accelerometer 124. The processor 110 can classify the motion state as either motion state 1 or motion state 2. The motion state 1 and motion state 2 can be the same as motion state 1 and motion state 2 that are classified in operation 510.

If the motion state is classified as motion state 1, the processor 110 proceeds to operation 1020. If the motion state is classified as motion state 2, the processor 110 proceeds to operation 1030.

In operation 1015, the processor 110 can incorporate an input type 1 from zero or more modules 120. For example, when the at least one module 120 is a red-green-blue (RGB) camera 122, the processor 110 can incorporate an input type 1 from the RGB camera 122.

In operation 1020, based on the motion state being classified as motion state 1 in operation 1010, the processor 110 estimates leakage and performs further signal processing A. For example, the further signal processing A can be the further signal processing A described in operation 515. More particularly, if motion state 1 corresponds to a moving state, the processor 110 can estimate leakage CIR from the raw CIR obtained from the radar and use the estimated leakage CIR to perform the further signal processing A. For example, the processor 110 can obtain a raw CIR profile from the radar that is denoted as CRAW=CLEAK+CTARGET, where CLEAK is the CIR contribution from leakage and CTARGET is the CIR contribution from desired targets. In motion state 1, CLEAK and CTARGET can have different statistical properties across time. For example, CTARGET can significantly change with time while in motion state 1 but CLEAK can change comparatively slowly in motion state 1. More particularly, a peak of a target object can change a corresponding tap index with time while a leakage peak is stationary. As the electronic device 100 moves, an amplitude of a signal of one or more of the target object and the tap index changes, indicating that the peak is reflected off a legitimate target object. In contrast, as the electronic device 100 moves, neither the amplitude nor the tap index changes, indicating that the peak is due to leakage rather than being reflected off of a legitimate target object. The estimated leakage can then be stored in the memory 130 as an estimated leakage profile to be applied to raw CIR data by the processor 110. The signal processing A performed in operation 1020 can be improved by the incorporation of the input type 1 data obtained by the module 120 in operation 1015.

In operation 1025, the processor 110 can incorporate an input type 2 from zero or more modules. In some embodiments, the at least one module 120 can be a red-green-blue (RGB) camera 122 and the processor 110 can incorporate an input type 2 from the RGB camera 122. In this embodiment, the input type 1 and input type 2 are the same type of input. In another embodiment, the at least one module 120 can be a GPS module and the processor 110 can incorporate an input type 2 from the GPS module that identifies a location of the electronic device 100. In this embodiment, the input type 1 and input type 2 are different types of inputs.

In operation 1030, in response to determining the generated filter including the estimated leakage from motion state 1 is available, the processor 110 uses the estimated leakage from motion state 1 for further signal processing B. For example, the processor 110 can apply the generated filter including the estimated leakage profile obtained in operation 1020 to raw CIR data to estimate a leakage subdued CIR. The estimated leakage subdued CIR can be used to accurately detect target objects and distinguish the detected target objects from false targets that can interfere with the navigation path of the electronic device 100. In some embodiments, the signal processing B can be improved by the incorporation of the input type 2 data obtained by the module 120 in operation 1025.

In various embodiments, either or both of input type 1 and input type 2 can be an input from a motion sensor. The motion sensor can be one of the modules 220n or module 120. In embodiments where input type 1 is an input from the motion sensor, in operation 1020 the processor 110 can null out the CIR amplitude that corresponds to all Doppler shifts in a particular FNULLSET as a part of the further signal processing A. In embodiments where input type 2 is an input from the motion sensor, in operation 1030 the processor 110 can null out the CIR amplitude that corresponds to all Doppler shifts in a particular FNULLSET as a part of the further signal processing B.

Figure 11:
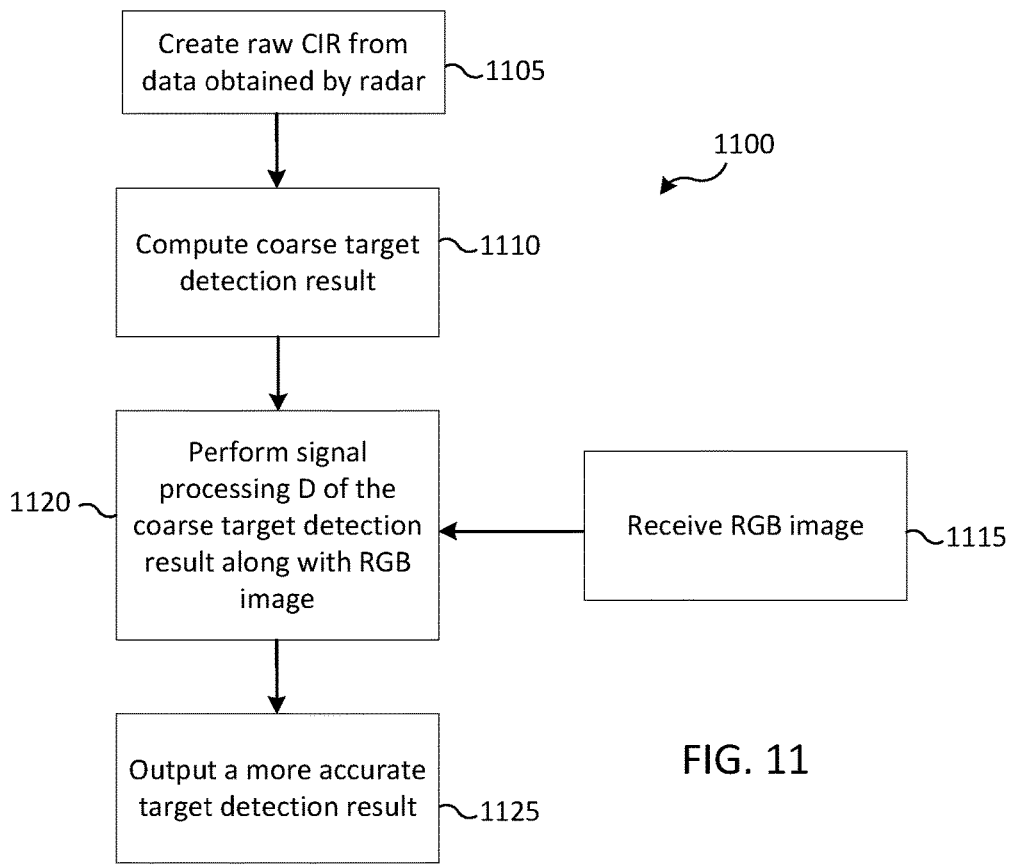
FIG. 11 illustrates a method of camera assisted radar target detection according to various embodiments of the present disclosure.

FIG. 11 illustrates a method of camera assisted radar target detection according to various embodiments of the present disclosure. For example, FIG. 11 depicts an example method 1100 of motion assisted leakage cancelation that can be executed by the processor 110, radar transceiver 126, and RGB camera 122 illustrated in FIG. 1.

In operation 1105, the processor 110 creates a raw CIR from the data obtained by the radar transceiver 126. For example, the raw CIR can be created by the same method as described in operation 305.

In operation 1110, the processor 110 computes a coarse target detection result. The coarse detection result can be performed in the same manner as the signal processing performed in, for example, operation 915. In particular, the processor 110 can obtain a raw CIR profile from the radar that is denoted as CRAW=CLEAK+CTARGET, where CLEAK is the CIR contribution from leakage and CTARGET is the CIR contribution from desired targets. CLEAK and CTARGET can have different statistical properties across time. For example, CTARGET can significantly change with time but CLEAK can change comparatively slowly. As the electronic device 100 moves, an amplitude of a signal of one or more of the target object and the tap index changes, indicating that the peak is reflected off a legitimate target object. In contrast, as the electronic device 100 moves, neither the amplitude nor the tap index changes, indicating that the peak is due to leakage rather than being reflected off of a legitimate target object. In this manner, the processor 110 can compute a coarse, or preliminary, target detection result based only on data received from the radar transceiver 126.

In operation 1115, the processor 110 can receive an RGB image from an RGB camera, for example the camera 122. In operation 1120, the processor 110 can perform signal processing D of the coarse target detection result obtained in operation 1110 with the aid of the RGB image received in operation 1115. For example, the processor 110 can compare the RGB image received in operation 1115 to the coarse target detection result generated in operation 1110 to identify whether the target objects detected by the coarse target detection result are shown in the RGB image.

In operation 1125, based on the result of the comparison, the processor 110 can output a more accurate target detection result. For example, the processor 110 can confirm that some or all of the target objects detected by the coarse target detection result are shown in the RGB image when the objects detected by the coarse target detection result are shown in the RGB image. When the objects detected by the coarse target detection result are shown in the RGB image are confirmed, the confirmed objects are included in the output target detection result. As another example, the processor 110 can determine an inconsistency between the objects detected by the coarse target detection result and the RGB image indicating that some or none of the objects detected by the coarse target detection result are shown in the RGB image. When the processor 110 determines an inconsistency between the objects detected by the coarse target detection result and the RGB image, the processor 110 can request additional input, for example from another input type 1 or input type 2 as described in FIG. 10, or further retrieve a stored filter of estimated leakage from the memory 130 to apply to the coarse target detection result. In other embodiments, the processor 110 can determine to restart the method 1100 and create a new raw CIR from new data obtained by the radar transceiver 126.

Figure 12:
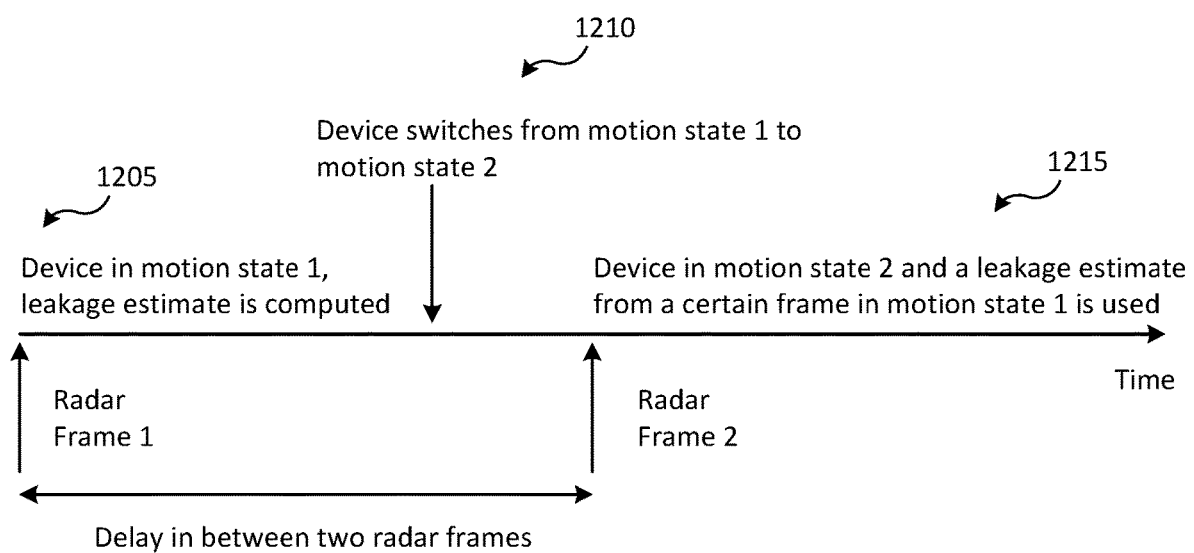
FIG. 12 illustrates a timing diagram according to various embodiments of the present disclosure.

FIG. 12 illustrates a timing diagram according to various embodiments of the present disclosure. More specifically, FIG. 12 illustrates a timing diagram of an electronic device, for example the electronic device 100, as the electronic device 100 transitions from motion state 1 to motion state 2.

In some embodiments, the electronic device 100 can transition between motion state 1 and motion state 2 at or around the same time that radar transceiver 126 transmits and receives radar signals. For example, the electronic device 100 can begin in motion state 1, e.g. in motion, and transition to motion state 2, e.g. static, during the process of the radar transceiver 126 transmitting and receiving radar signals. The transition from motion state 1 to motion state 2 can cause an unavoidable delay between two successive radar frames such as Radar Frame 1 and Radar Frame 2. The unavoidable delay can be due to real time processing of CIR obtained from Radar Frame 1 or the unavoidable delay can be introduced for the purpose of power saving for the electronic device 100.

FIG. 12 illustrates two radar frames, Radar Frame 1 and Radar Frame 2, and a delay between Radar Frame 1 and Radar Frame 2. In operation 1205, the electronic device 100 is in motion state 1 during Radar Frame 1. While in motion state 1, the processor 110 computes a leakage estimate as described herein for motion state 1. For example, the leakage estimate can be computed by the same method as described in operation 515 for motion state 1. The leakage estimate can be stored as a filter in the memory 130.

In operation 1210, the electronic device 100 switches, or transitions, from motion state 1 to motion state 2. In some embodiments, the electronic device 100 can transition from a state of motion in motion state 1 to a static state in motion state 2. In some embodiments, the electronic device 100 can transition from movement at a first speed in motion state 1 to a second speed in motion state 2. The delay between Radar Frame 1 and Radar Frame 2 can be large and in some embodiments, large enough for the electronic device 100 to change the motion state during the delay between radar frames. For example, as illustrated in FIG. 12, the electronic device 100 can be in motion state 1 during Radar Frame 1 and in motion state 2 during Radar Frame 2. In some embodiments, for example when the electronic device 100 is a robot used for simultaneous localization and mapping (SLAM) using radar, the delay can be due to the use of a low cost processor that uses a significant amount of time to process the output from Radar Frame 1 for map generation or building.

In operation 1215, the electronic device is illustrated in motion state 2 during Radar Frame 2. While in motion state 2, the processor 110 computes a leakage estimate as described herein for motion state 2 using a particular frame in motion state 1. For example, the leakage estimate can be computed by the same method as described in operation 520 for motion state 2, where the previously estimated leakage of operation 1205 is used for further signal processing of Radar Frame 2. The particular frame from motion state 1 that is used can be Radar Frame 1 or a previous frame occurring before Radar Frame 1 that is not pictured. For example, when the electronic device 100 was in motion state 1 during Radar Frame 1, leakage can be estimated using the CIR obtained from Radar Frame 1.

FIG. 12 also illustrates the delay between Radar Frame 1 and Radar Frame 2. In some embodiments, the delay between Radar Frame 1 and Radar Frame 2 is large and temporal variation of the leakage contribution to CIR during motion state 2 is significant. In these embodiments, the leakage estimate computed in operation 1205 can be stale by the time the processor 110 performs signal processing in operation 1215. When the leakage estimate computed in operation 1205 is stale, use of the stale leakage estimate can lead to inaccurate target detection at operation 1215. To avoid use of the stale leakage estimate, the processor 110 can at least partially update leakage estimates in Radar Frame 2 as described in FIGS. 13-14.

Figure 13:
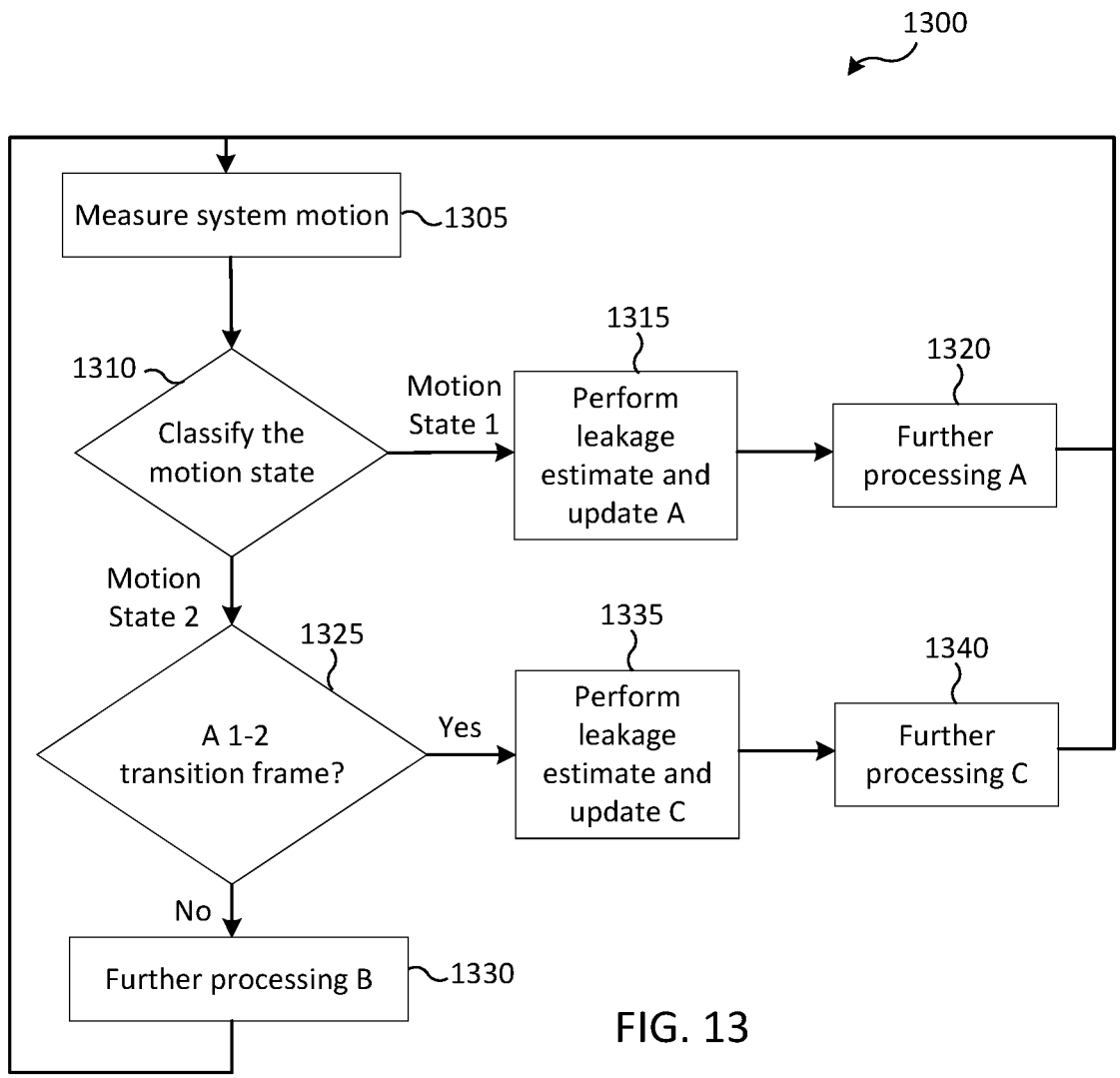
FIG. 13 illustrates a method of leakage cancelation according to various embodiments of the present disclosure.

FIG. 13 illustrates a method of leakage cancelation according to various embodiments of the present disclosure. More specifically, FIG. 13 illustrates a method 1300 of leakage cancelation to be performed by an electronic device, for example the electronic device 100, during or after the electronic device 100 transitions from motion state 1 to motion state 2.

In operation 1305, the motion of an electronic device, for example the electronic device 100, is measured by module 120. For example, the module 120 can include an accelerometer 124 that measures a speed of the electronic device 100 at a particular time.

In operation 1310, the processor 110 classifies the motion state of the electronic device 100 based on the data obtained by the accelerometer 124. The processor 110 can classify the motion state as either motion state 1 or motion state 2. In some embodiments, motion state 1 can refer to a state in which the electronic device 100 is in motion and motion state 2 can refer to a state in which the electronic device 100 is static. In other embodiments, motion state 1 can refer to a state in which the electronic device 100 is in motion at a speed above a threshold value and motion state 2 can refer to a state in which the electronic device 100 is in motion at a speed less than the threshold value. The motion states can further include a sub-state. For example, motion state 1 can include a sub-state that corresponds to a certain angular and linear velocity of the radar.

In operation 1315, based on the motion state being classified as motion state 1 in operation 1310, the processor 110 estimates leakage of the radar signal transmitted and received by the radar transceiver 126 and performs update A. For example, if motion state 1 corresponds to a moving state, the processor 110 can estimate leakage CIR from the raw CIR obtained from the radar and use the estimated leakage CIR to perform the further signal processing A. For example, the processor 110 can obtain a raw CIR profile from the radar that is denoted as CRAW=CLEAK+CTARGET, where CLEAK is the CIR contribution from leakage and CTARGET is the CIR contribution from desired targets. In motion state 1, CLEAK and CTARGET can have different statistical properties across time. For example, CTARGET can significantly change with time while in motion state 1 but CLEAK can change comparatively slowly in motion state 1. More particularly, a peak of a target object can change a corresponding tap index with time while a leakage peak is stationary. As the electronic device 100 moves, an amplitude of a signal of one or more of the target object and the tap index changes, indicating that the peak is reflected off a legitimate target object. In contrast, as the electronic device 100 moves, neither the amplitude nor the tap index changes, indicating that the peak is due to leakage rather than being reflected off of a legitimate target object. The estimated leakage can then be stored in the memory 130 as a filter including an estimated leakage profile to be applied to raw CIR data by the processor 110. The CIR can be further updated to include the filter resulting in a leakage subdued radar signal.

In operation 1320, the processor 110 performs further processing A. In some embodiments, the further processing A can include one or both of target detection based on the leakage estimate obtained in operation 1315 and tracking of the leakage subdued radar signal obtained in operation 1315.

In operation 1325, based on the motion state being classified as motion state 2 in operation 1310, the processor 110 determines whether the current frame of the electronic device 100 is defined as a 1-2 transition frame. A 1-2 transition frame is defined as the electronic device 100 being in the first frame of motion state 2 immediately after the electronic device 100 transitions from motion state 1 to motion state 2. The immediateness of the first frame of motion state 2 can be determined based on comparing an amount of time the electronic device 100 has been in motion state 2 after leaving motion state 1 to a predetermined value. If the amount of time the electronic device 100 has been in motion state 2 after leaving motion state 1 is not less than or equal to the predetermined value, the processor 110 determines the current frame is not a 1-2 transition frame and proceeds to operation 1330. If the amount of time the electronic device 100 has been in motion state 2 after leaving motion state 1 is less than or equal to the predetermined value, the processor 110 determines the current frame is a 1-2 transition frame and proceeds to operation 1335.

In operation 1330, based on the transition state not being classified as a 1-2 transition state in operation 1325, the processor 110 uses previously estimated leakage for further signal processing B. For example, the processor 110 can apply the estimated leakage profile obtained in operation 1315 or in operation 1335 to raw CIR data to estimate a leakage subdued CIR. In some embodiments, the further processing B can further include one or both of target detection based on the leakage estimate obtained in operation 1315 or in operation 1335 and tracking of the leakage subdued radar signal obtained in operation 1315 or in operation 1335.

In operation 1335, based on the transition state being classified as a 1-2 transition state in operation 1325, the processor 110 performs a leakage estimate and update C. To perform the leakage estimate and update C, the processor 110 utilizes the filter generated from the leakage estimate A and applies an estimate filter based on the 1-2 transition frame to CIR based on the electronic device 100 being in the motion state 2. The leakage estimate and update C is further described in the description of FIG. 15. Once obtained, the estimated leakage can then be stored in the memory 130 as an estimated leakage profile to be applied to raw CIR data by the processor 110. The CIR can be further updated to include the filter resulting in a leakage subdued radar signal.

In operation 1340, the processor 110 performs further processing C. In some embodiments, the further processing C can include one or both of target detection based on the leakage estimate obtained in operation 1335 and tracking of the leakage subdued radar signal obtained in operation 1335.

Figure 14:
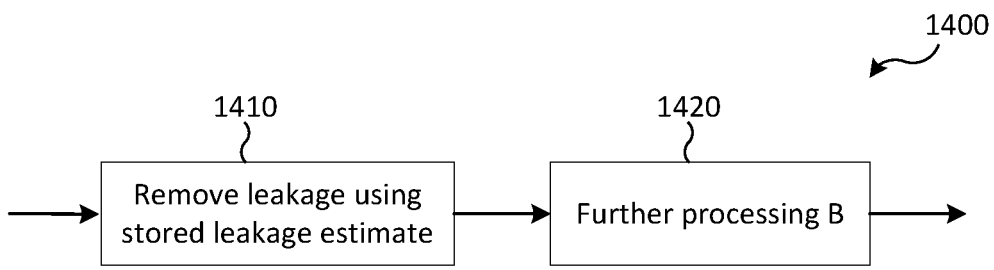
FIG. 14 illustrates a method of leakage estimation according to various embodiments of the present disclosure.

FIG. 14 illustrates a method of leakage estimation according to various embodiments of the present disclosure. More specifically, FIG. 14 illustrates a method 1400 of leakage estimation, for example as described in operation 1330, to be performed by an electronic device, for example the electronic device 100. In the method 1400, the leakage estimation does not perform an update of the leakage during the latter frames after the 1-2 transition frame as the electronic device 100 remains in motion state 2.

In operation 1410, the processor 110 removes leakage using a filter including a stored leakage estimate obtained at a previous point in time when the electronic device 100 was determined to be in motion state 1. For example, the processor 110 can retrieve a filter including a stored estimated leakage profile, such as the filter saved in operation 1315, and apply the stored filter to raw CIR data obtained by the radar transceiver 126 to estimate a leakage subdued CIR. The estimated leakage subdued CIR can be used to accurately detect target objects and distinguish the detected target objects from false targets that can interfere with the navigation path of the electronic device 100.

In operation 1420, the processor 110 can perform further processing B of the leakage subdued CIR obtained in operation 1410. In some embodiments, the further processing B can include one or both of target detection based on the leakage estimate obtained in operation 1410 and tracking of the leakage subdued radar signal obtained in operation 1410.

Figure 15:
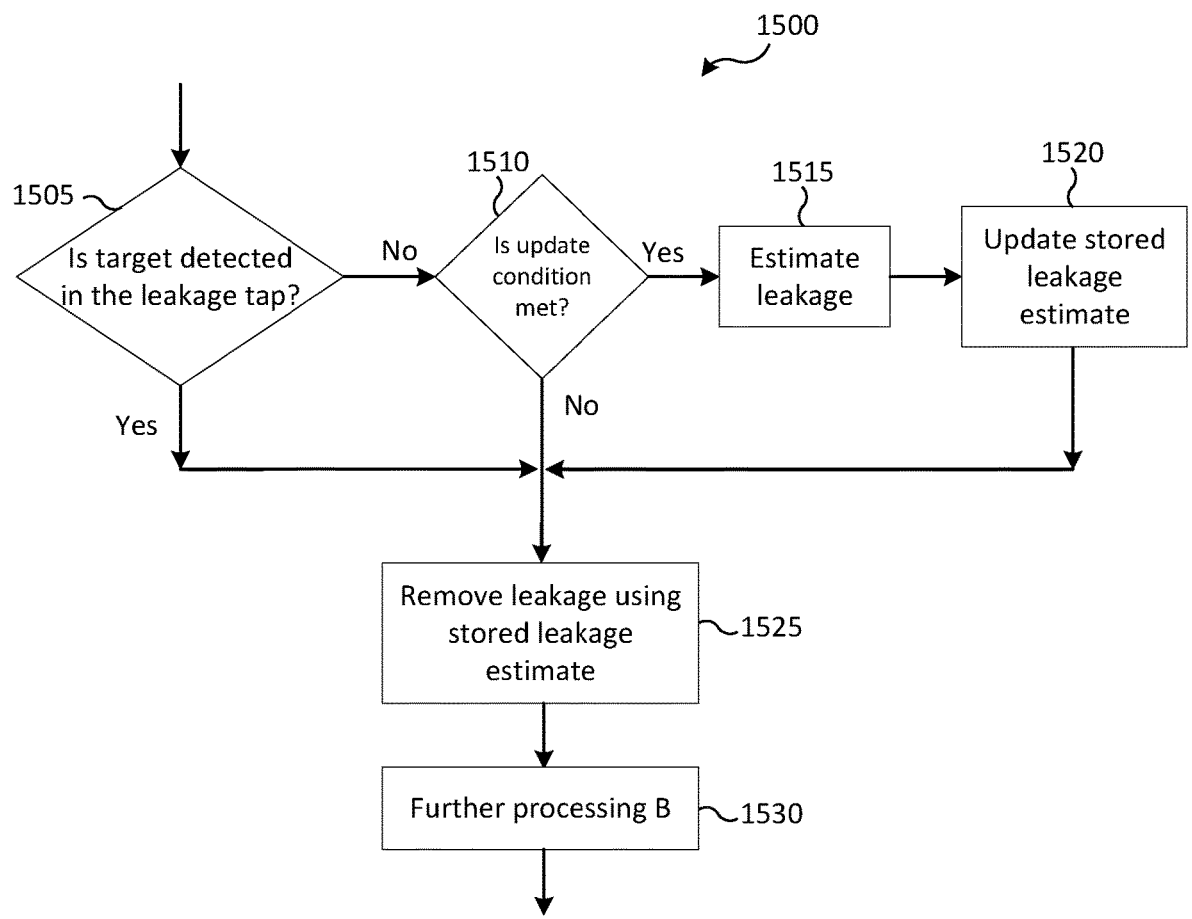
FIG. 15 illustrates a method of leakage estimation according to various embodiments of the present disclosure.

FIG. 15 illustrates a method of leakage estimation according to various embodiments of the present disclosure. More specifically, FIG. 15 illustrates a method 1500 of leakage estimation, for example as described in operation 1330, to be performed by an electronic device, for example the electronic device 100.

In operation 1505, the processor 110 determines whether a target is detected in the leakage tap. In some embodiments, the processor 110 can determine the presence of targets based on one or both of past measurements of the target signal and a leakage signal. To determine the presence of targets, the processor 110 can utilize a history of detected target's ranges to infer whether a signal tap of the radar signal is clear of targets. In some embodiments, past leakage estimates that are stored in the memory 130 can be compared with the radar signal received by the radar transceiver 126 in the current frame. If the past leakage estimate in a tap is considered to be close to the current radar signal of the tap, the processor 110 can determine that a target has not been detected in the tap and the processor 110 proceeds to operation 1510. If the leakage estimate in a tap is not considered to be close to the current radar signal of the tap, the processor 110 can determine that a target has been detected in the tap and the processor 110 proceeds to operation 1525.

To determine whether a past leakage estimate in a tap is considered to be close to the current radar signal of the tap, the processor 110 can utilize various metrics. For example, when both the leakage estimate and the radar signal are complex numbers, the processor 110 can calculate a normalized Euclidean distance of the difference between the leakage estimate and the radar signal. Although the normalized Euclidean norm is described herein as the distance metric, this example should not be construed as limiting. Other suitable distance metrics can also be used. The calculated normalized Euclidean distance can be compared to a predetermined threshold value to determine closeness of the past leakage estimate to the current radar signal. In various embodiments, the past leakage estimate in a tap is considered to be close to the current radar signal of the tap based on the normalized Euclidean distance being less than the predetermined threshold value.

The normalized Euclidean distance can be calculated by $|x-y|/|x|$, where x is the complex signal in an earlier frame and y is the current complex signal. The normalized Euclidean distance is calculated only when x has a large enough signal strength (e.g., 5 dB above the noise floor). Therefore, the closeness metric of $(x,y)=|x-y|/|x|$ if $|x|>=$some threshold, and the closeness metric equals infinity if $|x|<$some threshold.

In operation 1510, the processor 110 determines whether an update condition has been met. The update condition can be a further condition, in addition to whether a target is detected in the leakage tap, imposed on whether performing the leakage estimate and update for the tap is beneficial. In one embodiment, the condition can impose a periodic update at regular intervals K rather than updated at every frame. The regular interval K can be denoted as a time interval. The processor 110 can determine the regular interval K based on prior knowledge or assumption of the speed of variation of the leakage estimate as the electronic device 100 is in motion state 2.

In operation 1515, the processor 110 estimates leakage of the CIR based on the update condition being met in operation 1510. In particular, the processor 110 estimates leakage in the tap based on the past leakage estimate of the tap. By incorporating the past leakage estimate and determining that a target has not been detected in the tap, the processor 110 tags the particular peak in the tap as leakage.

In operation 1520, the processor 110 updates the generated filter stored in the memory 130 with the estimated leakage generated in operation 1515. In various embodiments, the processor 110 can overwrite a filter previously stored in the memory 130 with the updated filter generated in operation 1515 or the processor 110 can update a filter previously stored in the memory 130 with the updated leakage estimate.

In operation 1525, the processor 110 removes leakage using a generated filter that stores the leakage estimate. In various embodiments, the processor 110 can perform operation 1525 based on any one of a target being detected in the leakage tap in operation 1505, the update condition not being met in operation 1510, and the processor 110 updating the stored leakage estimate in operation 1520. Operation 1525 can be performed by the processor 110 in the same way as operation 1510. For example, the processor 110 can retrieve a filter including a stored estimated leakage profile, such as the filter saved in operation 1520, and apply the stored filter to raw CIR data obtained by the radar transceiver 126 to estimate a leakage subdued CIR. The estimated leakage subdued CIR can be used to accurately detect target objects and distinguish the detected target objects from false targets that can interfere with the navigation path of the electronic device 100.

In operation 1530, the processor 110 can perform further processing B of the leakage subdued CIR obtained in operation 1525. In some embodiments, the further processing B can include one or both of target detection based on the leakage estimate obtained in operation 1525 and tracking of the leakage subdued radar signal obtained in operation 1525.

Figure 16:
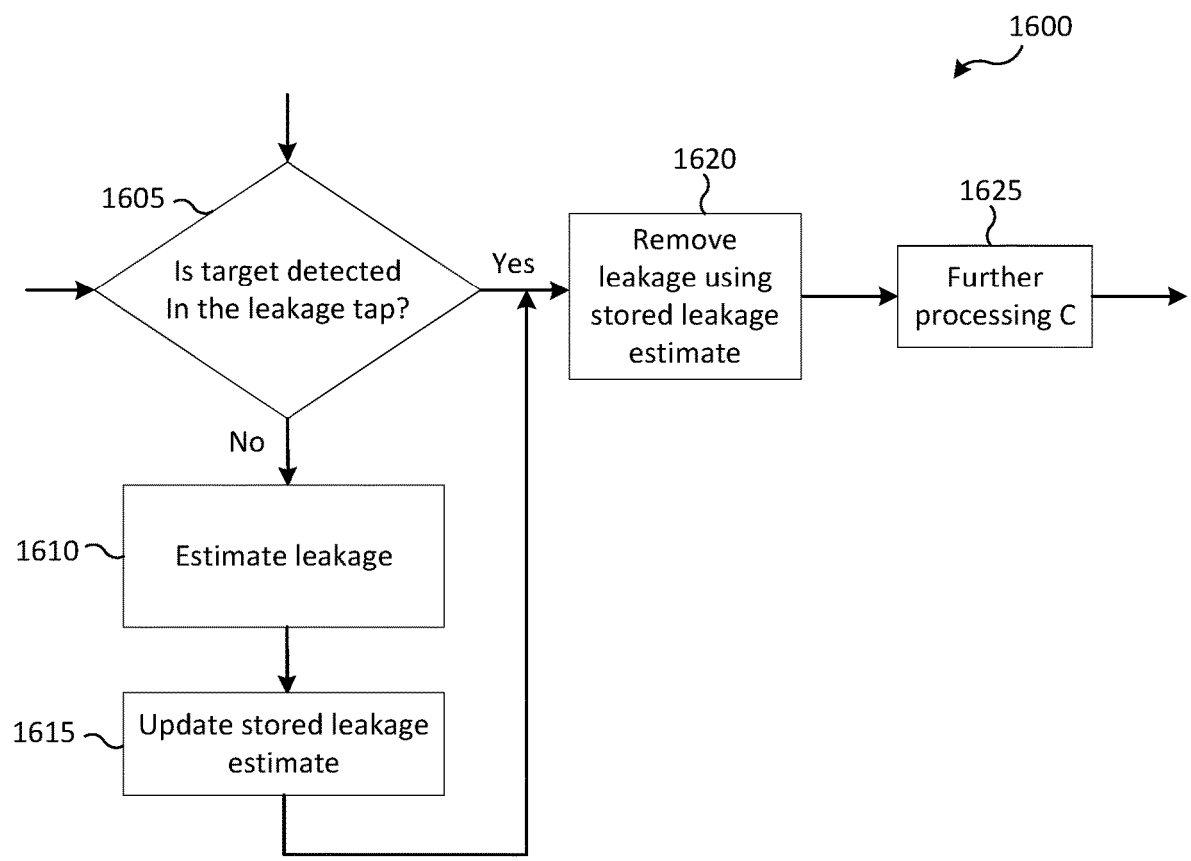
FIG. 16 illustrates a method of leakage estimation and updating according to various embodiments of the present disclosure.

FIG. 16 illustrates a method of leakage estimation and updating according to various embodiments of the present disclosure. More specifically, FIG. 16 illustrates a method 1600 of leakage estimation and updating, for example as described in operation 1335, to be performed by an electronic device, for example the electronic device 100.

The method 1600 illustrated in FIG. 16 is performed as the electronic device 100 is in motion state 2 and more specifically as the electronic device is in a 1-2 transition frame. Because the electronic device 100 is in a 1-2 transition frame, direct separation of the leakage signal and the target signal can be difficult and unreliable. Accordingly, the method 1600 can estimate leakage during the 1-2 transition frame in a manner that avoids using a stale leakage estimate that can otherwise leave residue on the updated CIR when used for leakage cancelation. As a result, the processor 110 can perform a leakage estimate and update only when the processor 110 reasonably determines no target is detected in the leakage signal position. In various embodiments, the signal position can refer to different domains. For example, the signal position can be referenced in the delay tap index.

In operation 1605, the processor 110 determines whether a target is detected in the leakage tap. This can also be described as determining whether the target is in a potential signal position. In some embodiments, the processor 110 can determine the presence of targets based on one or both of past measurements of the target signal and a leakage signal. To determine the presence of targets, the processor 110 can utilize a history of detected target's ranges to infer whether a signal tap of the radar signal is close to or clear of targets. In some embodiments, past leakage estimates that are stored in the memory 130 can be compared with the radar signal received by the radar transceiver 126 in the current frame. If a target is not detected in the leakage tap, the processor 110 proceeds to operation 1610. If a target is detected in the leakage tap, the processor 110 proceeds to operation 1620.

To determine whether a past leakage estimate in a tap is considered to be close to the current radar signal of the tap, the processor 110 can utilize various metrics. For example, when both the leakage estimate and the radar signal are complex numbers, the processor 110 can calculate a normalized Euclidean distance of the difference between the leakage estimate and the radar signal. In some embodiments, the difference in the normalized Euclidean distance can measure the distance between the potential signal position and a potential target position. The calculated a normalized Euclidean distance can be compared to a predetermined threshold value to determine closeness of the past leakage estimate to the current radar signal. In various embodiments, the past leakage estimate in a tap is considered to be close to the current radar signal of the tap based on the normalized Euclidean distance being less than the predetermined threshold value. The normalized Euclidean distance can be calculated as described in operation 1505.

In operation 1610, the processor 110 estimates leakage of the CIR based on a target not being detected in the leakage tap in operation 1605. In particular, the processor 110 estimates leakage in the tap based on the past leakage estimate of the tap. By incorporating the past leakage estimate and determining that a target has not been detected in the tap, the processor 110 tags the particular peak in the tap as leakage.

In operation 1615, the processor 110 updates the generated filter stored in the memory 130 in the signal position with the estimated leakage generated in operation 1610. In various embodiments, the processor 110 can overwrite a filter previously stored in the memory 130 with the updated filter generated in operation 1610 or the processor 110 can update a filter previously stored in the memory 130 with the updated leakage estimate.

In operation 1620, the processor 110 removes leakage using a generated filter that stores the leakage estimate. In various embodiments, the processor 110 can perform operation 1620 based on any one of a target being detected in the leakage tap in operation 1605 and the processor 110 updating the stored leakage estimate in operation 1615. In some embodiments, the processor 110 can remove the leakage by retrieving a filter including a stored estimated leakage profile, such as the filter saved in operation 1615, and applying the stored filter to raw CIR data obtained by the radar transceiver 126 to estimate a leakage subdued CIR. The estimated leakage subdued CIR can be used to accurately detect target objects and distinguish the detected target objects from false targets that can interfere with the navigation path of the electronic device 100.

In other embodiments, the processor 110 can utilize a target estimate that is available in the frame prior to the current frame. The target estimate is available because the 1-2 transition frame is an immediate frame from a frame in motion state 1 where leakage can be separated from the target signal. The processor 110 can track the consistency of the target in the last frame of motion state 1 before the 1-2 transition frame and, based on the consistency, infer whether a target is in the signal position. For example, a target can be detected in the delay domain at a range value of X meters from the electronic device 100 and the processor 110 can detect a delay tap corresponding to a range of Y meters. The processor 110 can calculate an absolute value of the difference in the distance between the delay tap and target, where the absolute value is denoted by |Y-X|. When the absolute value is greater than the maximum distance a target can travel within a frame duration, the processor 110 can determine that there is no target in the particular tap and therefore the leakage in the tap can be measured and stored to the filter corresponding to the stored leakage estimate. The maximum distance the target can travel within the frame duration can be determined based on prior knowledge of the maximum speed of the target.

In some embodiments, the processor 110 can exclude leakage at the taps or corresponding to or within a predetermined threshold value of the detected targets from being updated. For example, if the processor 110 is unable to determine that a peak corresponds to leakage rather than a potential target, the processor 110 does not update the leakage to remove the peak. Such an update to the leakage can be performed in a later frame, for example in leakage estimate and update B as described in operation 1330 and method 1500. Performing this leakage estimate when the electronic device 100 is determined to not be in a 1-2 transition frame, for example as determined in operation 1325, can provide a more accurate leakage estimate.

In operation 1625, the processor 110 can perform further processing C of the leakage subdued CIR obtained in operation 1620. In some embodiments, the further processing C can include one or both of target detection based on the leakage estimate obtained in operation 1620 and tracking of the leakage subdued radar signal obtained in operation 1620.

To perform the leakage estimate and update C, the processor 110 utilizes the filter generated from the leakage estimate A and applies an estimate filter based on the 1-2 transition frame to CIR based on the electronic device 100 being in the motion state 2. The leakage estimate and update C is further described in operation 1340. Once obtained, the estimated leakage can then be stored in the memory 130 as an estimated leakage profile to be applied to raw CIR data by the processor 110. The CIR can be further updated to include the filter resulting in a leakage subdued radar signal.

Figure 17:
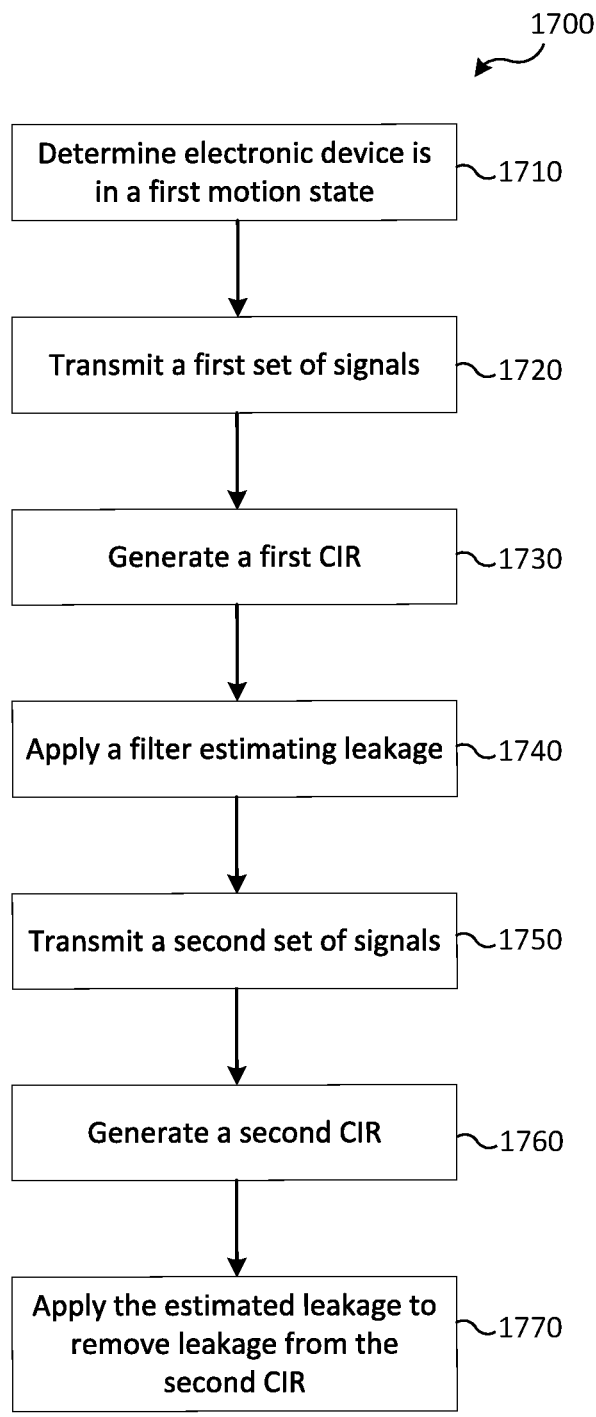
FIG. 17 illustrates a method of motion assisted leakage removal according to various embodiments of the present disclosure.

FIG. 17 illustrates a method of motion assisted leakage removal according to various embodiments of the present disclosure. In particular, FIG. 17 illustrates a method 1700 of motion assisted leakage removal that can be performed by one or more electronic devices as described herein.

In operation 1710, the processor 110 determines that the electronic device 100 is in a first motion state. In some embodiments, the first motion state can refer to the electronic device 100 being in motion. In some embodiments, the first motion state can refer to the electronic device 100 being in motion at a speed of greater than or equal to a predetermined threshold value.

In operation 1720, the processor 110 controls the radar transceiver 126 to transmit a first set of signals. In some embodiments, the first set of signals can be transmitted at or around 60 GHz for the purposes of radar processing. The radar transceiver 126 can include an antenna array 128 including a transmitter to transmit the first set of signals and a receiver to receive the first set of signals after the first set of signals have been reflected off of a target object.

In operation 1730, the processor 110 generates a first channel impulse response (CIR) based on receipt of the reflections of the first set of signals. The first CIR is a metric that is used to identify and measure a strength of the received signals as a function of a distance of the reflective surface from the radar transceiver 126. The CIR is displayed with a tap index measuring distance as a function of the x-axis and an amplitude of the CIR as a function of the y-axis.

In operation 1740, the processor 110 applies a filter that estimates leakage that is present in the first CIR. The term leakage refers to peaks illustrated in the CIR that do not refer to target objects in the surrounding environment. The generated filter is expressed as a profile depicting the leakage in the first CIR.

In operation 1750, the processor 110 controls the radar transceiver 126 to transmit a second set of signals as the electronic device 100 is in a second motion state different from the first motion state. In embodiments where the first motion state refers to the electronic device 100 being in motion, the second motion state refers to the electronic device 100 being static. In embodiments where the first motion state refers to the electronic device 100 being in motion at a speed of greater than or equal to a predetermined threshold value, the second motion state can refer to the electronic device 100 being in motion at a speed of less than the predetermined threshold value. In another embodiment, where the first motion state refers to the electronic device 100 being in motion at a speed of greater than or equal to a predetermined threshold value, the second motion state can refer to the electronic device 100 being static. In some embodiments, the second set of signals can be transmitted at a frequency at or around 60 GHz for the purposes of radar processing.

In operation 1760, the processor 110 generates a second channel impulse response (CIR) based on the second set of signals. The second CIR is a metric that is used to identify and measure a strength of the signals received after transmission of the second set of signals as a function of a distance of the reflective surface from the radar transceiver 126. The second CIR is displayed with a tap index measuring distance as a function of the x-axis and an amplitude of the second CIR as a function of the y-axis.

In operation 1770, the processor 110 applies the estimated leakage from the first CIR to the second CIR to remove leakage from the second CIR. The processor 110 can overlay the generated filter on the second CIR and remove peaks in the second CIR that correspond to peaks in the generated filter. By removing the peaks that correspond to estimated leakage from the generated filter, the second CIR leaves only the peaks that do not correspond to estimated leakage. By leaving only the peaks that do not correspond to estimated leakage, the second CIR with the generated filter applied more accurately depicts target objects in the surrounding environment. The processor 110 can then use the second CIR with the generated filter applied to perform more accurate target detection, track the leakage subdued radar signal, or execute other processes that are assisted by a more accurate perspective of the surrounding environment.

In some embodiments, the electronic device can include a radar transceiver, a sensor, a processor operably connected to the radar transceiver and the sensor, and a memory operably connected to the processor. The radar transceiver can transmit and receive signals. The sensor is configured to detect motion of the electronic device. The processor is configured to determine, based on information obtained from the sensor, that the electronic device is in a first motion state, control the radar transceiver to transmit a first set of signals, generate a first channel impulse response (CIR) based on the first set of signals, apply a filter that estimates a leakage depicted by the first CIR, in a second motion state, control the radar transceiver to transmit a second set of signals, generate a second CIR based on the second set of signals, and apply the estimated leakage from the first CIR to the second CIR to remove leakage from the second CIR.

In some embodiments, the electronic device includes a sensor camera configured to generate an image of an environment surrounding the electronic device. The processor is configured to estimate the leakage based on the generated image.

In some embodiments, to apply the estimated leakage to the second CIR, the processor is configured to determine the electronic device is in a transition state where the electronic device is transitioning from the first motion state to the second motion state, identify a target is in a potential leakage position by tracking a target in a final frame of the first motion state, calculate a difference in the potential leakage position and a potential target position, and based on the difference indicating the target is not in the leakage position, update the estimated leakage and apply the updated leakage estimate to remove leakage from a third CIR referring to the transition state.

In some embodiments, the processor is configured to, based on the estimated leakage being unavailable, trigger the electronic device to enter the first motion state in order to generate the first CIR.

In some embodiments, the electronic device comprises a memory configured to store the estimated leakage. The processor is configured to apply the estimated leakage that is stored in the memory to the second CIR to remove the leakage from the second CIR.

In some embodiments, in the first motion state the electronic device is in motion and in the second motion state, the electronic device is static. In some embodiments, in the first motion state the electronic device is in motion at a first speed and in the second motion state, the electronic device is in motion at a second speed.

None of the description in this application should be read as implying that any particular element, step, or function is an essential element that must be included in the claim scope. Moreover, none of the claims is intended to invoke 35 U.S.C. § 112(f) unless the exact words "means for" are followed by a participle.

What is claimed is:
1. An electronic device comprising:
 a radar transceiver configured to transmit and receive signals;
 a sensor configured to detect motion of the electronic device; and a processor operably connected to the radar transceiver and the sensor, the processor configured to:
  determine, based on information obtained from the sensor, a first motion state of the electronic device,
  during the first motion state of the electronic device, control the radar transceiver to transmit a first set of signals,
  generate a first channel impulse response (CIR) based on the first set of signals being received,
  apply a filter that estimates a leakage included in the first CIR,
  during a second motion state of the electronic device, control the radar transceiver to transmit a second set of signals,
  generate a second CIR based on the second set of signals, and
  apply the estimated leakage from the first CIR to the second CIR to remove the leakage from the second CIR.

2. The electronic device of claim 1, further comprising:
a camera configured to generate an image of an environment surrounding the electronic device,
wherein the processor is further configured to estimate the leakage based on the generated image.

3. The electronic device of claim 1, wherein, in applying the estimated leakage to the second CIR, the processor is further configured to:
  determine the electronic device is in a transition state where the electronic device is transitioning from the first motion state to the second motion state;
  identify a target is in a potential leakage position by tracking the target in a final frame of the first motion state;
  calculate a difference in a distance between the potential leakage position and a potential target position; and
  based on the difference indicating the target is not in the leakage position, update the estimated leakage and apply the updated leakage estimate to remove leakage from a third CIR referring to the transition state.

4. The electronic device of claim 1, wherein the processor is configured to, based on the estimated leakage being unavailable, trigger the electronic device to enter the first motion state in order to generate the first CIR.

5. The electronic device of claim 1, further comprising:
a memory configured to store the estimated leakage,
wherein the processor is configured to apply the estimated leakage that is stored in the memory to the second CIR to remove the leakage from the second CIR.

6. The electronic device of claim 1, wherein:
in the first motion state, the electronic device is in motion; and
in the second motion state, the electronic device is stationary.

7. The electronic device of claim 1, wherein:
in the first motion state, the electronic device is in motion at a first speed; and
in the second motion state, the electronic device is in motion at a second speed.

8. A method of removing leakage for radar applications, the method comprising:
  determining, based on information obtained from a sensor, that an electronic device is in a first motion state;
  transmitting, via a radar transceiver, a first set of signals;
  generating a first channel impulse response (CIR) based on the first set of signals being received;
  applying a filter that estimates a leakage included in the first CIR;
  in a second motion state, transmitting, via the radar transceiver, a second set of signals;
  generating a second CIR based on the second set of signals; and
  applying the estimated leakage from the first CIR to the second CIR to remove the leakage from the second CIR.

9. The method of claim 8, wherein:
the electronic device includes a camera configured to generate an image of an environment surrounding the electronic device; and
estimating the leakage comprises applying the generated image.

10. The method of claim 8, wherein applying the estimated leakage to the second CIR further comprises:
  determining the electronic device is in a transition state where the electronic device is transitioning from the first motion state to the second motion state;
  identifying a target is in a potential leakage position by tracking the target in a final frame of the first motion state;
  calculating a difference in a distance between the potential leakage position and a potential target position; and
  based on the difference indicating the target is not in the leakage position, updating the estimated leakage and applying the updated leakage estimate to remove leakage from a third CIR referring to the transition state.

11. The method of claim 8, further comprising, based on the estimated leakage being unavailable, triggering the electronic device to enter the first motion state in order to generate the first CIR.

12. The method of claim 8, further comprising:
  storing the estimated leakage in a memory; and
  applying the estimated leakage that is stored in the memory to the second CIR to remove the leakage from the second CIR.

13. The method of claim 8, wherein:
in the first motion state, the electronic device is in motion; and
in the second motion state, the electronic device is static.

14. The method of claim 8, wherein:
in the first motion state, the electronic device is in motion at a first speed; and
in the second motion state, the electronic device is in motion at a second speed.

15. A non-transitory computer readable medium storing instructions that, when executed by a processor, cause the processor to:
  determine, based on information obtained from a sensor on an electronic device, that the electronic device is in a first motion state;
  control a radar transceiver to transmit a first set of signals;
  generate a first channel impulse response (CIR) based on the first set of signals being received;
  apply a filter that estimates a leakage included in the first CIR;
  in a second motion state, control the radar transceiver to transmit a second set of signals;
  generate a second CIR based on the second set of signals; and
  apply the estimated leakage from the first CIR to the second CIR to remove the leakage from the second CIR.

16. The non-transitory computer readable medium of claim 15, wherein:

the electronic device includes a camera configured to generate an image of an environment surrounding the electronic device; and the non-transitory computer readable medium stores instructions that, when executed by the processor, cause the processor to estimate the leakage based on the generated image.

17. The non-transitory computer readable medium of claim 15, wherein, the instructions to apply the estimated leakage to the second CIR, comprise instructions that, when executed by the processor, cause the processor to:

determine the electronic device is in a transition state where the electronic device is transitioning from the first motion state to the second motion state;

identify a target is in a potential leakage position by tracking the target in a final frame of the first motion state;

calculate a difference in a distance between the potential leakage position and a potential target position; and based on the difference indicating the target is not in the leakage position, update the estimated leakage and apply the updated leakage estimate to remove leakage from a third CIR referring to the transition state.

18. The non-transitory computer readable medium of claim 15, wherein the non-transitory computer readable medium further stores instructions that, when executed by the processor, cause the processor to, based on the estimated leakage being unavailable, trigger the electronic device to enter the first motion state in order to generate the first CIR.

19. The non-transitory computer readable medium of claim 15, wherein the non-transitory computer readable medium further stores instructions that, when executed by the processor, cause the processor to:

store the estimated leakage in the non-transitory computer readable medium; and apply the estimated leakage that is stored in the non-transitory computer readable medium to the second CIR to remove the leakage from the second CIR.

20. The non-transitory computer readable medium of claim 15, wherein:

in the first motion state, the electronic device is in motion and in the second motion state, the electronic device is static, or in the first motion state, the electronic device is in motion at a first speed and in the second motion state, the electronic device is in motion at a second speed.

* * * * *